(12) United States Patent
Horii

(10) Patent No.: US 12,223,028 B2
(45) Date of Patent: Feb. 11, 2025

(54) AUTHENTICATION DEVICE AND AUTHENTICATION METHOD FOR SINGLE SIGN-ON

(71) Applicant: FUJITSU LIMITED, Kawasaki (JP)

(72) Inventor: Motoshi Horii, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 453 days.

(21) Appl. No.: 17/725,588

(22) Filed: Apr. 21, 2022

(65) Prior Publication Data

US 2023/0025150 A1     Jan. 26, 2023

(30) Foreign Application Priority Data

Jul. 26, 2021   (JP) ................................ 2021-121279

(51) Int. Cl.
  *G06F 21/41*    (2013.01)
  *G06F 21/33*    (2013.01)
  *H04L 9/40*     (2022.01)

(52) U.S. Cl.
  CPC .............. *G06F 21/41* (2013.01); *G06F 21/33* (2013.01); *H04L 63/0815* (2013.01)

(58) Field of Classification Search
  CPC ....... G06F 21/41; G06F 21/33; H04L 63/0815
  See application file for complete search history.

(56) References Cited

U.S. PATENT DOCUMENTS

| | | | |
|---|---|---|---|
| 9,130,927 B2* | 9/2015 | Ju | H04W 12/068 |
| 10,027,648 B2 | 7/2018 | Bowman et al. | |
| 2004/0210771 A1* | 10/2004 | Wood | G06F 21/6209 726/8 |
| 2007/0143829 A1* | 6/2007 | Hinton | H04L 63/0815 726/8 |
| 2017/0374070 A1* | 12/2017 | Shah | H04L 63/20 |

FOREIGN PATENT DOCUMENTS

JP       2017-45328 A       3/2017

* cited by examiner

*Primary Examiner* — Amie C. Lin
(74) *Attorney, Agent, or Firm* — Fujitsu Intellectual Property Center

(57) ABSTRACT

An authentication device includes an authentication unit, a history information generator and a communication unit. The authentication unit executes, when a user terminal accesses a service provider system, an authentication process based on an authentication request that includes a description pertaining to an authentication condition and an authentication method that correspond to the service provider system. The history information generator generates history information. The history information includes information indicating whether the authentication condition is satisfied and information indicating a result of executing the authentication process by using the authentication method. The communication unit transmits the history information to the user terminal.

8 Claims, 29 Drawing Sheets

```
{
  ...
    "hist": [
      {
        "seq": 0,
        "comm": {
          "name": "InAM",
          "result": false
        },
        "date": "2021-03-08-19:00-08"
      },
      {
        "seq": 1,
        "comm": {
          "name": "FingerPrint",
          "result": true
        },
        "date": "2021-03-08-19:00-10"
      },
    ],
    ...
}
```

FIG. 5

```
{
  "payload": {
    "iss": "AUTHENTICATION SYSTEM",
    "sub": "09422648",
    "hist": [
      {
        "seq": 0,
        "comm": {
          "name": "InAM",
          "result": false
        },
        "date": "2021-03-08-19:00-08"
      },
      {
        "seq": 1,
        "comm": {
          "name": "FingerPrint",
          "result": true
        },
        "date": "2021-03-08-19:00-10"
      },
      ...
    ]
  },
  "sig": "VGhpc2lzc2ln..."
}
```

FIG. 6

| SERVICE NAME | LOGIC |
|---|---|
| Mail | if OnSite then IDandPassword; else ICCard; PIN; |
| SecretService | if InAM then ICCard; else FingerPrint |
| ⋮ | |

FIG. 12

| AUTHENTICATION ELEMENT | LOCATION | AUTHENTICATION PROGRAM NAME |
|---|---|---|
| Onsite | local | Onsite |
| ICCard | https://authmethodprov... | ICCard |
| ⋮ | | |

FIG. 14

AUTHENTICATION DEVICE AND AUTHENTICATION METHOD FOR SINGLE SIGN-ON

CROSS-REFERENCE TO RELATED APPLICATION

This application is based upon and claims the benefit of priority of the prior Japanese Patent Application No. 2021-121279, filed on Jul. 26, 2021, the entire contents of which are incorporated herein by reference.

FIELD

The embodiments discussed herein are related to an authentication device and an authentication method for single sign-on.

BACKGROUND

In recent years, various services have been provided over communication networks. However, security incidents caused by illicit logins often occur. Accordingly, in many cases, an authentication procedure for authenticating a user is executed when a service provider system is logged in.

Authentication techniques have been diversified to enhance the security level. For example, in multi-factor authentication, a user is authenticated based on a plurality of factors. As an example, the user may be authenticated based on an ID, a password, and biological information. In adaptive authentication, user authentication is performed in accordance with various authentication conditions. For example, a user (or a terminal of the user) may be allowed to use a service only when being located in a specified area.

Devices and methods have been proposed for appropriately determining combinations of authentication schemes corresponding to services (e.g., Japanese Laid-open Patent Publication No. 2017-045328). Authentication methods using position information of users have been proposed (e.g., U.S. patent Ser. No. 10/027,648 (U.S. Patent Publication No. 2018/0083943)).

Single sign-on has been put into practical use as one technique for enhancing user convenience. Single sign-on is a technique for allowing a plurality of systems to be logged in by performing authentication once.

Meanwhile, in many cases, service providing entities each determine an authentication method to be used when a service provider system is logged in. Thus, as authentication techniques become more diversified and complicated, it will be more difficult to realize single sign-on. It will be especially difficult to realize single sign-on for an authentication system provided by combining multi-factor authentication, in which a user is authenticated based on a plurality of factors, with adaptive authentication, which includes an authentication process corresponding to authentication conditions.

SUMMARY

According to an aspect of the embodiments, an authentication device includes: an authentication unit configured to execute, when a user terminal accesses a service provider system, an authentication process based on an authentication request that includes a description pertaining to an authentication condition and an authentication method that correspond to the service provider system; a history information generator configured to generate history information, the history information including information indicating whether the authentication condition is satisfied and information indicating a result of executing the authentication process by using the authentication method; and a communication unit configured to transmit the history information to the user terminal.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 illustrates an example of a communication system providing single sign-on;

FIG. 5 illustrates an example of the data structure of history information;

FIG. 6 illustrates an example of the data structure of a token;

FIG. 12 illustrates an example of a logic database;

FIG. 14 illustrates an example of an authentication process database;

DESCRIPTION OF EMBODIMENTS

Figure 1:
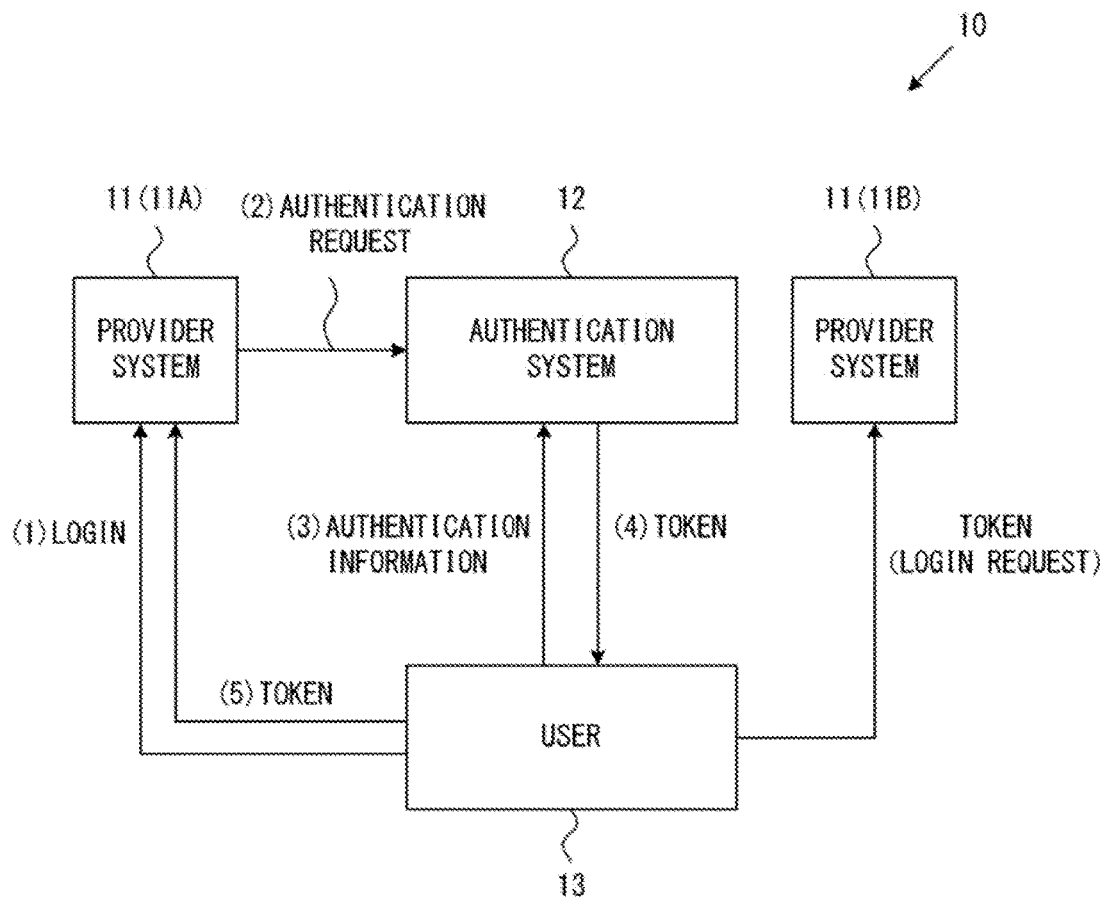

FIG. 1 illustrates an example of a communication system providing single sign-on. In this example, a communication system 10 includes a plurality of service provider systems 11 (11A-11B) and an authentication system 12. The service provider systems 11 can provide services to a user. The authentication system 12 authenticates a user who accesses a service provider system 11.

The user sends a login request to each of the service provider systems 11A-11B by using a user terminal 13 when receiving services to be provided by the service provider systems 11A-11B. In this example, first, the login request is transmitted from the user terminal 13 to the service provider system 11A.

Upon receipt of the login request from the user terminal 13, the service provider system 11A makes a request for the authentication system 12 to authenticate the user. In this case, for example, an authentication request may be forwarded to the authentication system by using redirection performed by the user terminal 13. The authentication request includes a list designating an authentication method (e.g., password, biological information).

The user terminal 13 transmits authentication information to the authentication system 12 in response to a user operation. For example, when the authentication system 12 requests a password, the user may input the password by using the user terminal 13. Then, the input password is transmitted from the user terminal 13 to the authentication system 12.

The authentication system 12 executes user authentication based on the authentication information received from the user terminal 13. When the authentication succeeds, the authentication system 12 generates and transmits a token to the user terminal 13. The token includes the signature of the entity that has executed the user authentication (in this example, the authentication system 12).

The user terminal 13 transmits the token generated by the authentication system 12 to the service provider system 11A. When the verification of the token succeeds, the service provider system 11A accepts the login. Next, a login request is transmitted from the user terminal 13 to the service provider system 11B. In this case, the previously generated token is also transmitted from the user terminal 13 to the service provider system 11B. When the verification of the token succeeds, the service provider system 11B also accepts the login.

As described above, by using the token obtained when logging in to the service provider system 11A, the user terminal 13 can log in to another system (in this example, the service provider system 11B). That is, single sign-on is realized.

However, in this method, if an authentication request designated by each of the service provider systems 11 is complicated, it may be incapable of being decided whether a login request received from a user should be accepted. Assume, for example, that the service provider system 11A designates the following authentication methods.

(1) In the morning, authentication is performed using an IC card.
(2) In the periods other than the morning, fingerprint authentication is performed.

In this case, the authentication system 12 needs to select an authentication method in accordance with authentication conditions. However, when an authentication request is formed from a list designating an authentication method, it will be difficult to designate an authentication method in accordance with the authentication conditions. In the existing adaptive authentication, it is decided whether authentication conditions are satisfied, but an authentication method is not designated in accordance with the authentication conditions.

Embodiments

Figure 2:
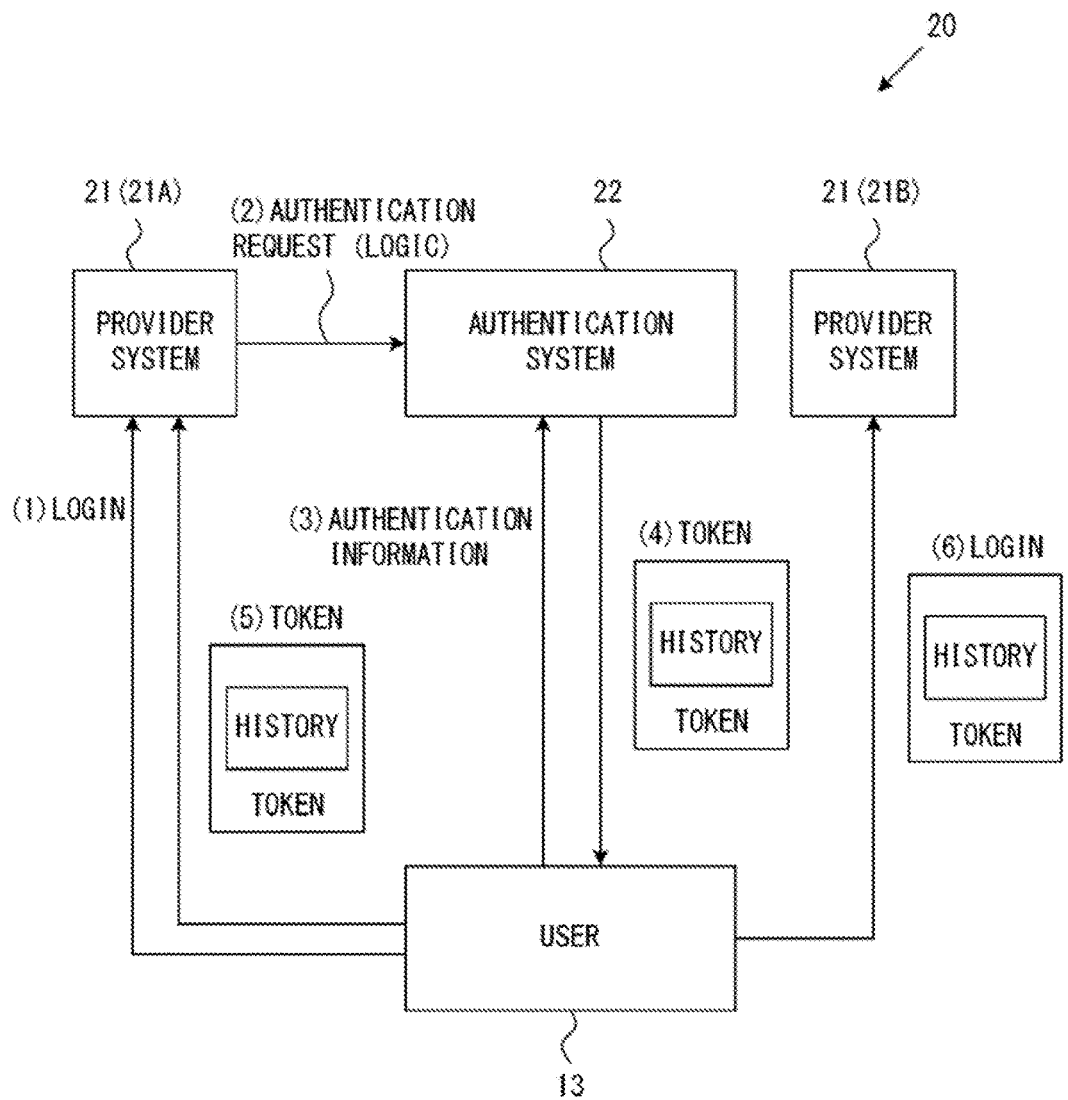
FIG. 2 illustrates an example of a communication system in accordance with embodiments of the present invention.

FIG. 2 illustrates an example of a communication system in accordance with embodiments of the present invention. In this example, a communication system 20 includes a plurality of service provider systems 21 (21A-21B) and an authentication system 22. As with the service provider systems 11, the service provider systems 21 can provide services to a user. As with the authentication system 12, the authentication system 22 authenticates a user who accesses a service provider system 21.

The user sends a login request to each of the service provider systems 21A-21B by using a user terminal 13 when receiving services to be provided by the service provider systems 21A-21B. In this example, first, the login request is transmitted from the user terminal 13 to the service provider system 21A.

Upon receipt of the login request from the user terminal 13, the service provider system 21A makes a request for the authentication system 22 to authenticate the user. In this case, for example, an authentication request may be forwarded to the authentication system 22 by using redirection performed by the user terminal 13.

In the communication system 10 depicted in FIG. 1, an authentication request is formed from a list designating an authentication method (e.g., password, biological information). By contrast, in the communication system 20 in accordance with embodiments of the present invention, an authentication request includes a description pertaining to authentication conditions and authentication methods. For example, this description may be a logical description including a conditional sentence. Thus, a description included in an authentication request may hereinafter be referred to as a "logic."

The user terminal 13 transmits authentication information to the authentication system 22 in response to a user operation. For example, when the authentication system 22 requests a password, the user may input the password by using the user terminal 13. Then, the input password is transmitted from the user terminal 13 to the authentication system 22. When the authentication system 22 requests fingerprints, the user inputs his/her fingerprints to the user terminal 13. Then, fingerprint data of the user is transmitted from the user terminal 13 to the authentication system 22.

The authentication system 22 performs user authentication based on the authentication information received from the user terminal 13. In this case, the authentication system 22 executes user authentication in accordance with a logic included in the authentication request. The authentication system 22 generates history information indicating a result of the user authentication. Specifically, the authentication history includes information indicating whether authentication conditions are satisfied, authentication methods selected in accordance with the authentication conditions, an authentication result, and a date and time when the authentication was executed. The authentication result indicates authentication success or authentication failure for each authentication method.

When the authentication process is finished, the authentication system 22 generates a token. As described above, the token includes the signature of the entity that has executed the user authentication (in this example, the authentication system 22). Note that the signature is an example of identification information identifying the entity that has executed the authentication process. The authentication system 22 transmits the history information and the token to the user terminal 13. In this case, the authentication system 22 may separately transmit the history information and the token to the user terminal 13. Alternatively, the authentication system 22 may generate and transmit a token including the history information to the user terminal 13. The following description is based on the assumption that a token including history information (or a token to which history information is attached) is transmitted from the authentication system 22 to the user terminal 13.

The user terminal 13 transmits the token generated by the authentication system 22 to the service provider system 21A. Then, the service provider system 21A decides, based on the history information attached to the token, whether to accept the login request received from the user terminal 13. Next, a login request is transmitted from the user terminal 13 to the service provider system 21B. In this case, the token generated for the login request for the service provider system 21A is also transmitted from the user terminal 13 to the service provider system 21B. Then, the service provider system 21B decides, based on the history information attached to the token, whether to accept the login request received from the user terminal 13.

As described above, by using the token obtained for the login request for the service provider system 21A, the user terminal 13 can log in to another service provider system (in this example, the service provider system 21B). That is, single sign-on is realized. In the communication system 20, an authentication request includes a logic pertaining to authentication conditions and authentication methods. The authentication system 22 executes user authentication in accordance with the logic. Hence, single sign-on can be realized even when each service provider system 21 has complicated authentication requirements (authentication conditions and authentication methods).

In the communication system 20 depicted in FIG. 2, the service provider systems 21A and 21B may be implemented by physically different computers or may be implemented by one computer. Login requests for the service provider systems 21 (21A, 21B) may mean login requests for services provided by the service provider systems 21. Thus, embodiments of the present invention pertain to single sign-on for services provided by the service provider systems 21.

Figure 3:
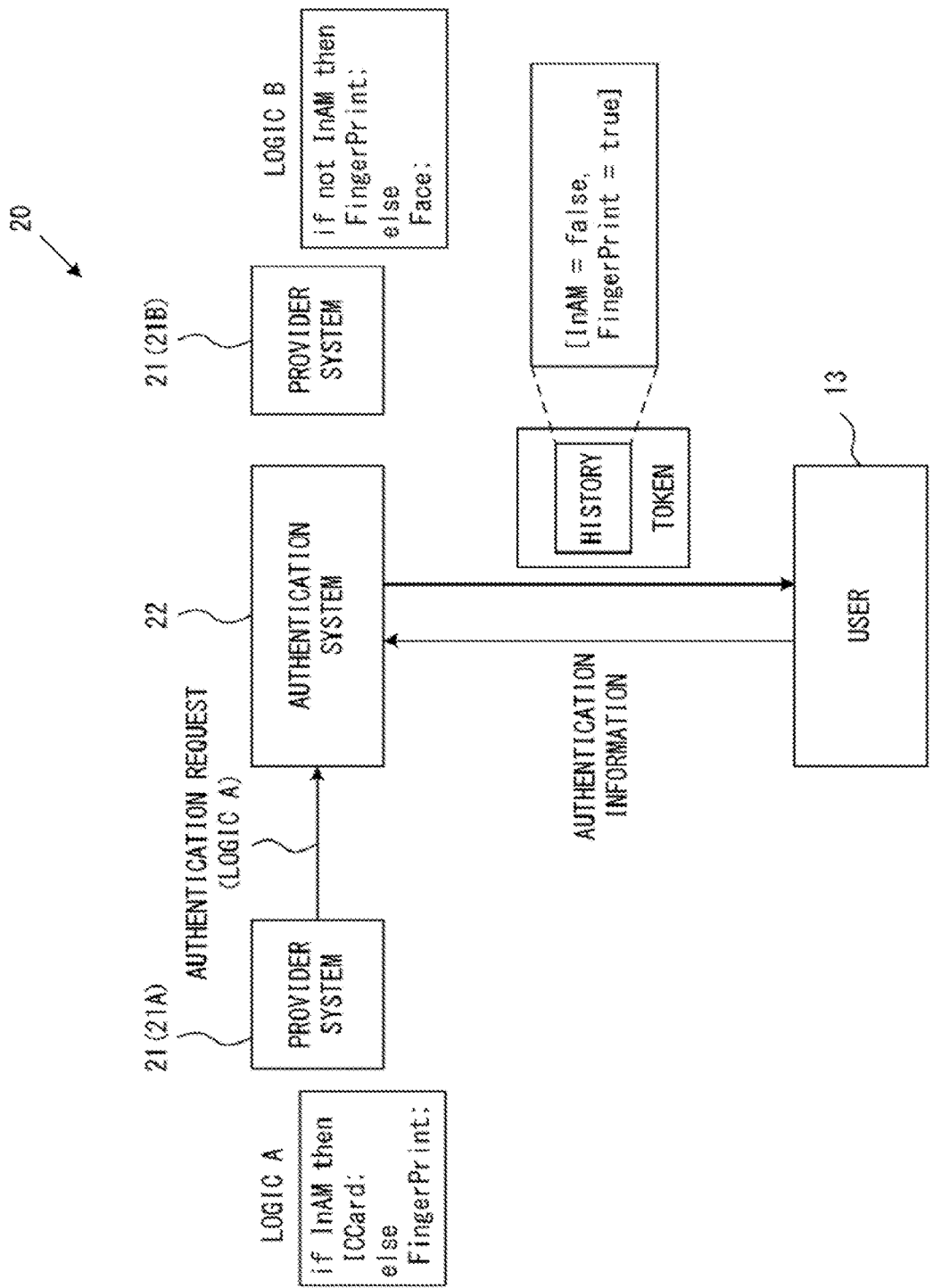
FIGS. 3 and 4 illustrate an example of an authentication procedure.
Figure 4:
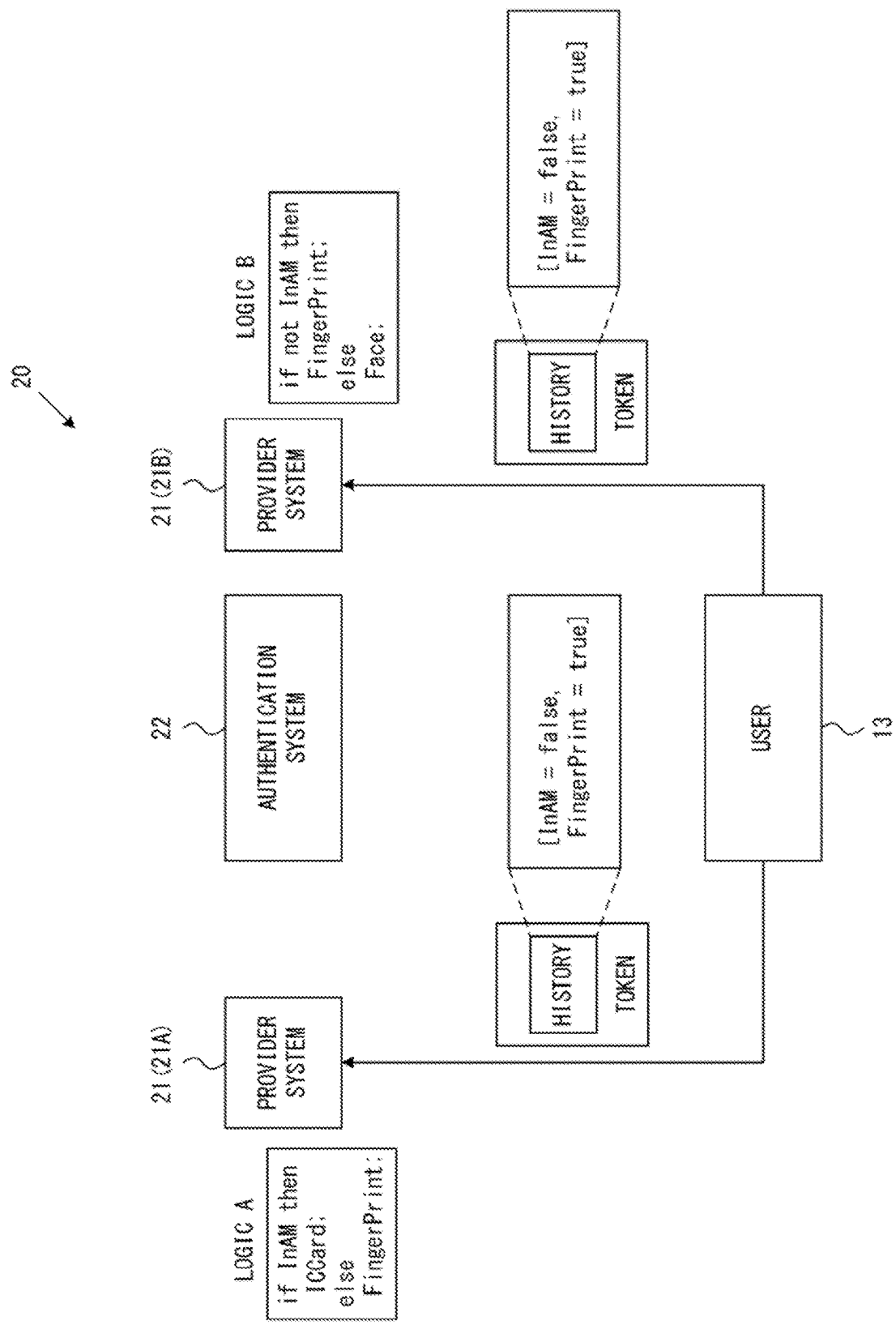

FIGS. 3-4 illustrate an example of an authentication procedure. In this example, the service provider systems 21A and 21B have different authentication policies. A different authentication policy is established for each service. The authentication policy of the service provider system 21A is described as a "logic A" in FIG. 3. In the logic A, "InAM" indicates morning. "ICCard" indicates authentication using an IC card. "FingerPrint" indicates fingerprint authentication. Thus, the logic A indicates that "authentication using an IC card is performed in the morning, and fingerprint authentication is performed in the periods other than the morning." The authentication policy of the service provider system 21B is described as a "logic B" in FIG. 3. In the logic B, "Face" indicates face authentication. Thus, the logic B indicates that "fingerprint authentication is performed in the periods other than the morning, and face authentication is performed in the morning."

Upon receipt of a login request from the user terminal 13, the service provider system 21A transmits an authentication request including the logic A to the authentication system 22. In this case, the authentication request may be transmitted from the service provider system 21A directly to the authentication system 22, or may be transmitted from the service provider system 21A via the user terminal 13 to the authentication system 22.

The authentication system 22 performs user authentication in accordance with the logic A. First, the authentication system 22 decides whether the current time is in the morning in accordance with "if InAM". This example is based on the assumption that the current time is "19:00." In this case, a determination result for "if InAM" is "false." The logic A also indicates that "fingerprint authentication is performed in the periods other than the morning." Hence, the authentication system 22 executes fingerprint authentication. In this case, the authentication system 22 transmits a message requesting fingerprint data to the user terminal 13. Upon receipt of fingerprint data from the user terminal 13, the authentication system 22 performs authentication of the user of the user terminal 13 by verifying the received fingerprint data with fingerprint data registered in advance. This example is based on the assumption that the fingerprint authentication succeeds. In this case, a determination result for "FingerPrint" is "true." The authentication system 22 generates history information indicating a result of the user authentication.

FIG. 5 illustrates an example of the data structure of history information. The history information indicates a result of user authentication based on the login A depicted in FIG. 3. "seq" indicates a sequence number indicating the order of executing an authentication process. "comm" indicates an authentication method or an authentication element. "name" indicates the name of an authentication method or an authentication element. "result" indicates an execution result of executing an authentication process. "date" indicates a date and time when authentication was executed.

In this example, the history information indicates the following execution results.
 (1) In a sequence 0, it is decided whether the current time is in the morning, and the result is "false."
 (2) In a sequence 1, it is decided whether fingerprint data is registered in a server, and the result is "true."

When the user authentication is finished, the authentication system 22 generates a token. As described above, the token includes the signature of the entity that has performed the user authentication (in this example, the authentication system 22).

FIG. 6 illustrates an example of the data structure of a token. In this example, history information is incorporated into the token. "iss" indicates an entity that generated the token. "sub" indicates an ID number for identifying a user. "hist" indicates history information. In this example, the history information depicted in FIG. 5 is incorporated into the token. "sig" indicates a signature to data (i.e., payload) including the history information and is generated using, for example, a private key of the entity that generated the token.

The authentication system 22 transmits, to the user terminal 13, the token to which the history information is attached. Then, as indicated in FIG. 4, the user terminal 13 transmits the token generated by the authentication system 22 to the service provider system 21A.

The service provider system 21A decides, based on the token received from the user terminal 13, whether to accept a login request received from the user terminal 13. First, the service provider system 21A verifies the signature added to the token. This example is based on the assumption that the verification of the signature succeeds. Next, the service provider system 21A verifies whether the history information satisfies the logic A. In this example, the logic A indicates that "authentication using an IC card is performed in the morning, and fingerprint authentication is performed in the periods other than the morning." Meanwhile, the history information indicates "InAM: false" and "FingerPrint: true". Hence, the service provider system 21A determines that the history information satisfies the logic A, and accepts the login request received from the user terminal 13.

A login request is also transmitted from the user terminal 13 to the service provider system 21B. In this case, together with this login request, the user terminal 13 transmits, to the service provider system 21B, the token generated for the login request for the service provider system 21A.

The service provider system 21B decides, based on the token received from the user terminal 13, whether to accept the login request received from the user terminal 13. First, the service provider system 21B verifies the signature added to the token. This example is based on the assumption that the verification of the signature succeeds. Next, the service provider system 21B checks whether the history information satisfies the logic B. In this example, the logic B indicates that "fingerprint authentication is performed in the periods other than the morning, and face authentication is performed in the morning." The history information indicates "InAM: false" and "FingerPrint: true". Hence, the service provider system 21B determines that the history information satisfies the logic B, and accepts the login request received from the user terminal 13.

Single sign-on is realized using the procedure described above. In this regard, the history information includes not only a result of successful authentication but also a result of failed authentication. In the examples depicted in FIGS. 3-6, the history information includes information indicating that an authentication condition is not satisfied. Specifically, the history information includes information indicating that a login request was made at a time in a period other than the morning, i.e., "InAM: false". Using the history information when another service provider system is logged in allows for accurate user authentication.

Figure 7:
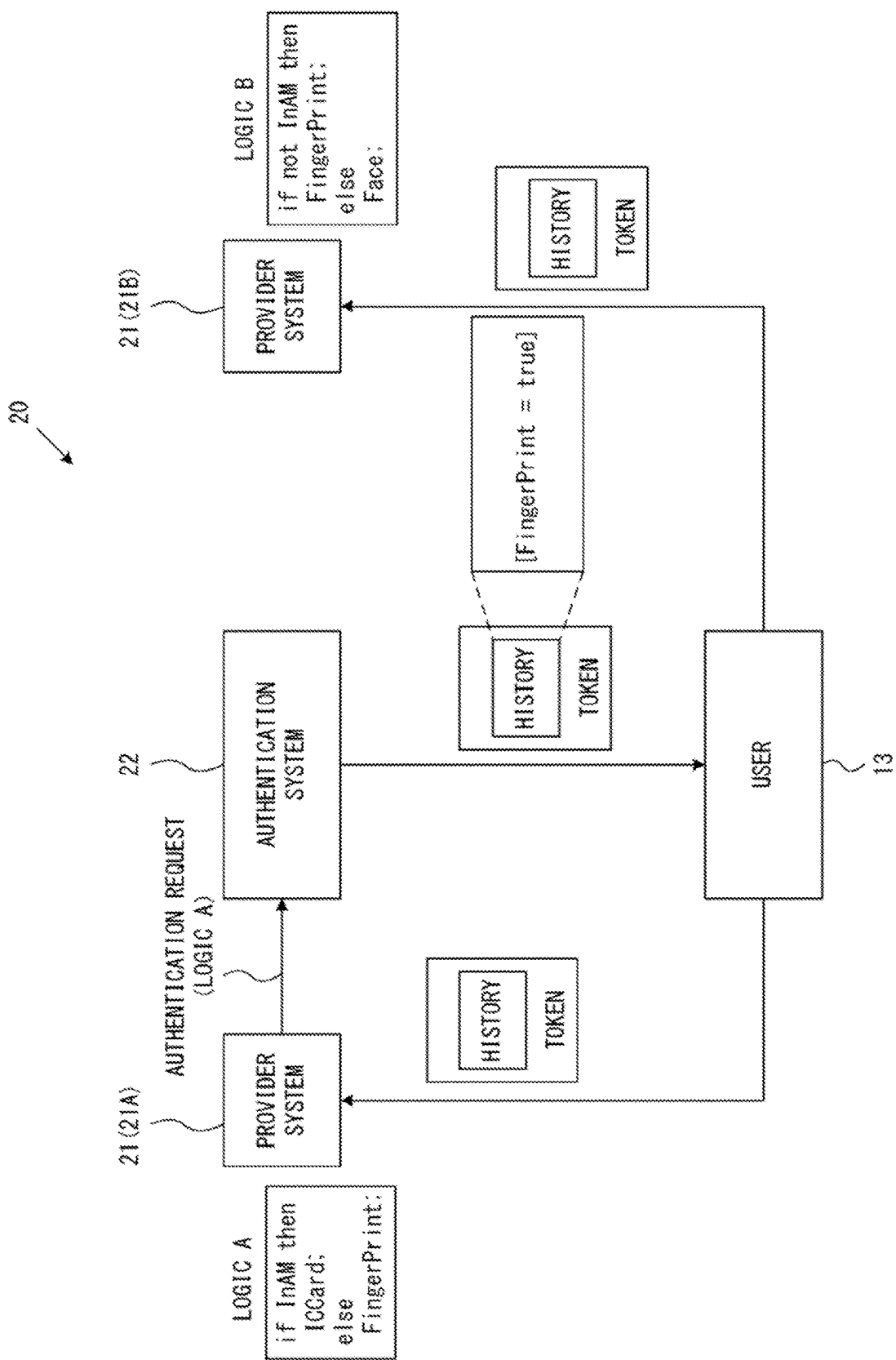
FIG. 7 illustrates an example of a case where a token that does not include a result of failed authentication is transmitted.

Assume, for example, that history information indicates only a result of successful authentication, as indicated in FIG. 7. In particular, in the case depicted in FIG. 7, the history information includes "FingerPrint: true" but does not include "InAM: false". In this situation, when receiving a token to which the history information is attached, the service provider system 21B cannot decide whether fingerprint authentication was performed in the morning or in the afternoon. Hence, the service provider system 21B cannot authenticate the user based on the logic B.

By contrast, in the embodiments depicted in FIGS. 3-6, the service provider system 21B can detect, by referring to history information, that fingerprint authentication was performed in the afternoon. Hence, the service provider system 21B can authenticate the user based on the logic B.

Figure 8:
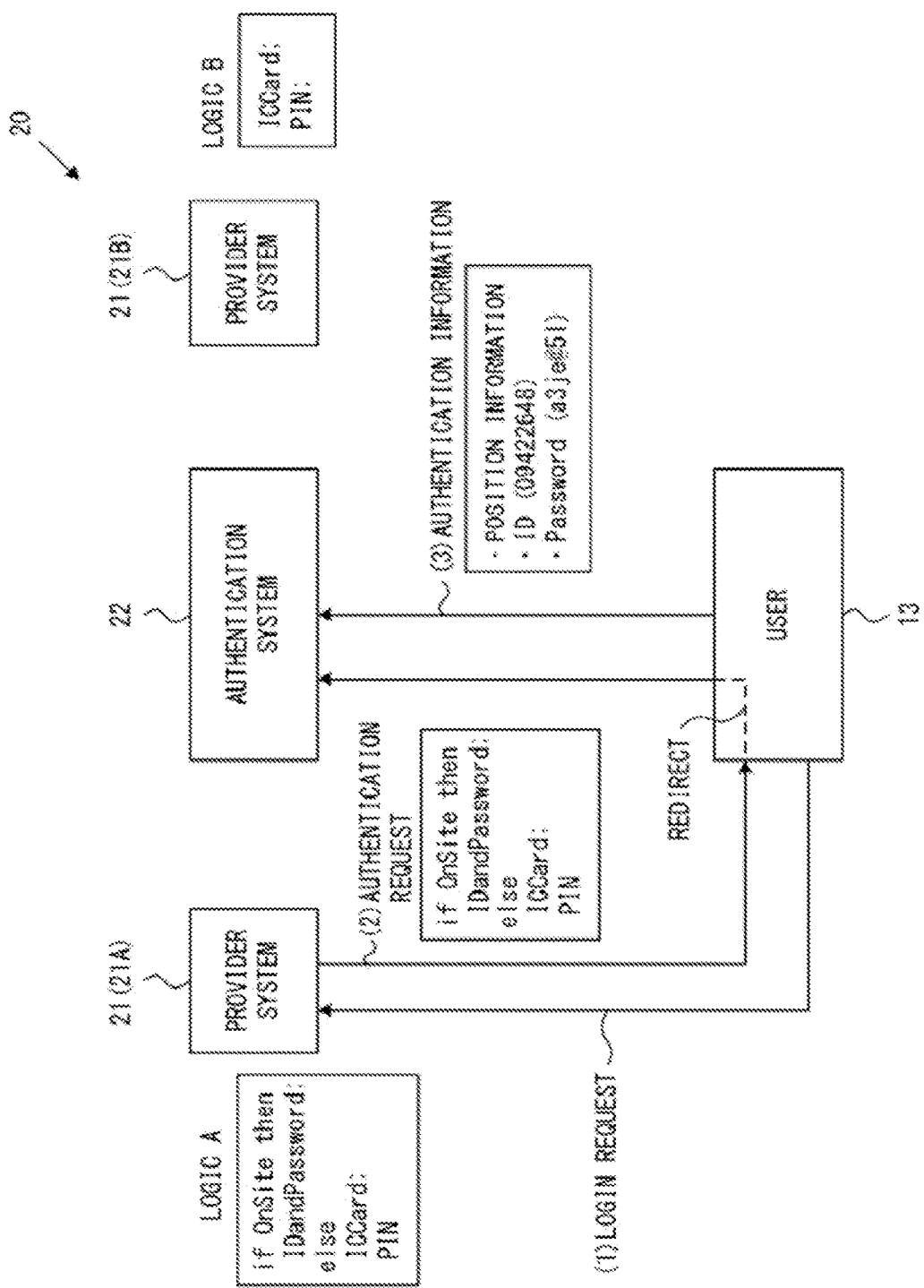
FIGS. 8-10 illustrate another example of an authentication procedure.
Figure 9:
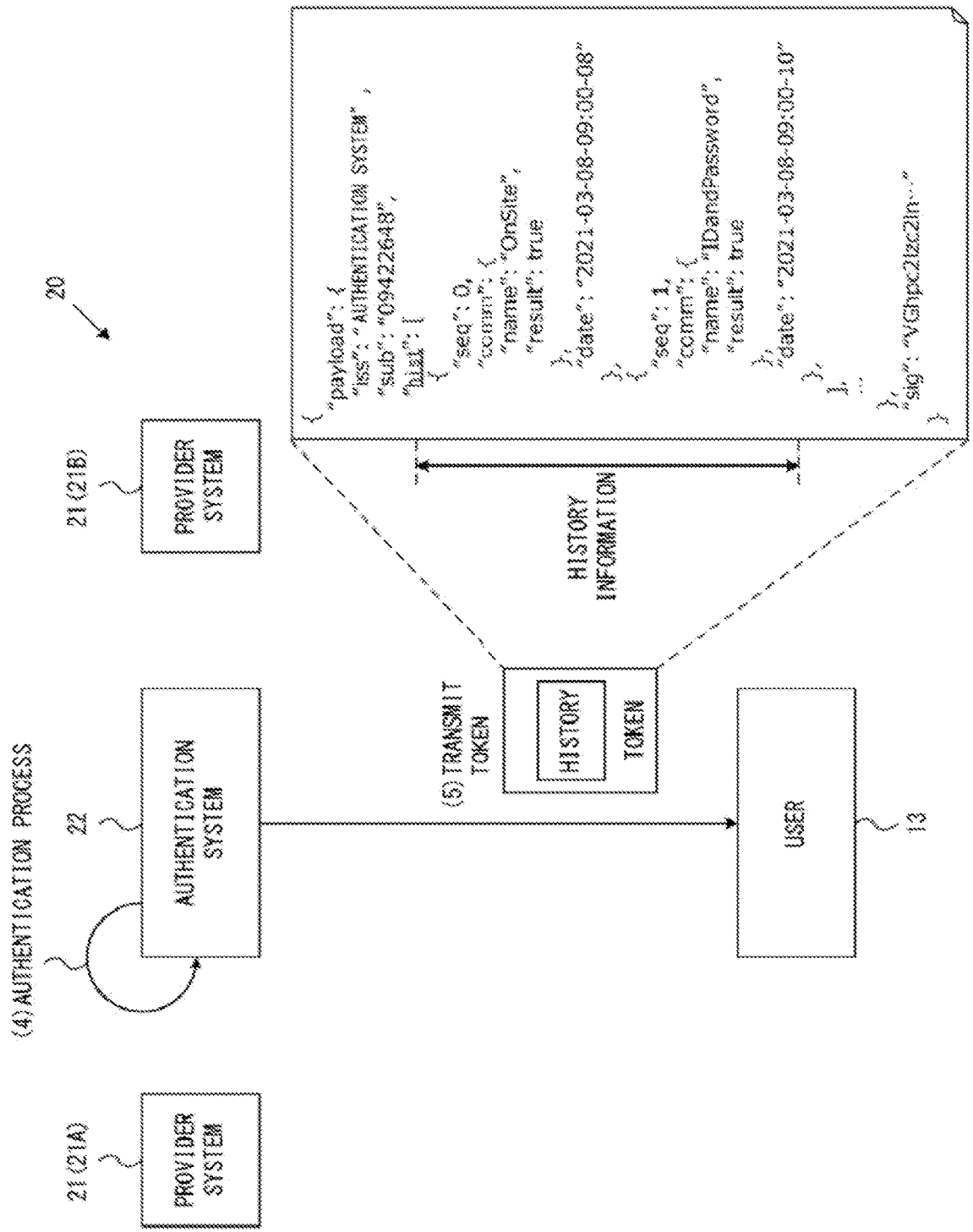
Figure 10:
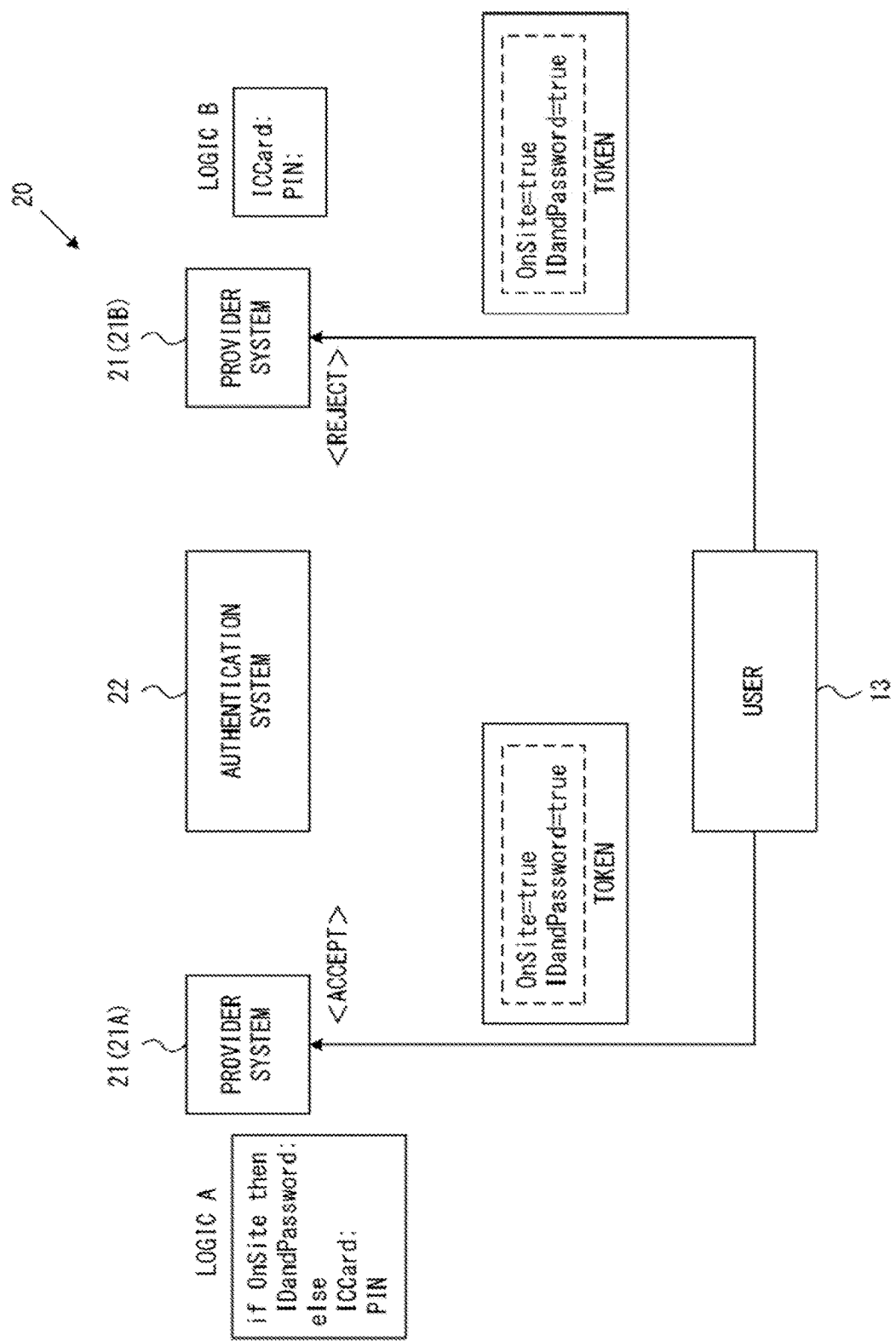

FIGS. 8-10 illustrate another example of the authentication procedure. In this example, the service provider systems 21A and 21B have different authentication policies. "OnSite" indicates whether a user is located in the site of a company. "IDandPassword" indicates authentication using an ID number and a password. "PIN" indicates authentication using a personal identification number. Hence, the logic A, which indicates the authentication policy of the service provider system 21A, means that "authentication is performed using an ID and a password when the user is located in the site of the company, and authentication is performed using an IC card and a PIN when the user is located outside the site of the company." The logic B, which indicates the authentication policy of the service provider system 21B, means that "authentication using an IC card and a PIN is performed."

In the communication system 20, the service provider system 21A, upon receipt of a login request from the user terminal 13, transmits an authentication request to the user terminal 13. The authentication request includes the logic A. The authentication request is redirected from the user terminal 13 to the authentication system 22. Furthermore, authentication information is transmitted from the user terminal 13 to the authentication system 22.

The transmission of authentication information is not particularly limited but may be implemented using, for example, the following procedure. When redirecting an authentication request to the authentication system 22, the user terminal 13 transmits position information indicating the position of the user terminal 13 to the authentication system 22. Then, by referring to the logic A included in the authentication request, the authentication system 22 decides whether the user is located in the site of the company. This example is based on the assumption that the user is located in the site of the company. In this case, the authentication system 22 transmits, based on the logic A, a message requesting an ID and a password to the user terminal 13. Upon the user inputting the ID and the password in response to the message, the user terminal 13 transmits the input ID and password to the authentication system 22.

The authentication system 22 performs user authentication in accordance with the logic A. First, the authentication system 22 decides, in accordance with "if OnSite", whether the user is located in the site of the company. The position of the user is detected using position information received from the user terminal 13. This example is based on the assumption that the user is located in the site of the company. In this case, a determination result for "if OnSite" is "true." The logic A indicates that "authentication is performed using an ID and a password when the user is located in the site of the company." The authentication system 22 performs user authentication using the ID and the password received from the user terminal 13. In this case, it is decided whether the pair of the ID and the password received from the user terminal 13 is registered in a database. This example is based on the assumption that the authentication succeeds. In this case, a determination result for "IDandPassword" is "true." The authentication system 22 generates history information indicating a result of the user authentication.

As depicted in FIG. 9, the history information is incorporated into a token. The token to which the history information is attached is transmitted from the authentication system 22 to the user terminal 13.

The user terminal 13 transmits the token generated by the authentication system 22 to the service provider system 21A. In response to this, the service provider system 21A decides, based on the token received from the user terminal 13, whether to accept a login request received from the user terminal 13.

The service provider system 21A checks a signature added to the token. This example is based on the assumption that the verification of the signature succeeds. Next, the service provider system 21A checks whether the history information satisfies the logic A. In this example, the logic A indicates that "authentication is performed using an ID and a password when the user is located in the site of the company, and authentication is performed using an IC card and a PIN when the user is located outside the site of the company." The history information indicates "Onsite: true" and "IDandPAssowrd: true". Hence, the service provider system 21A determines that the history information satisfies the logic A, and accepts the login request received from the user terminal 13.

A login request is also transmitted from the user terminal 13 to the service provider system 21B as depicted in FIG. 10. In this case, together with this login request, the user terminal 13 transmits, to the service provider system 21B, the token generated for the login request for the service provider system 21A.

The service provider system 21B decides, based on the token received from the user terminal 13, whether to accept the login request received from the user terminal 13. In particular, the service provider system 21B checks the signature added to the token. This example is based on the assumption that the verification of the signature succeeds. Next, the service provider system 21B checks whether the history information satisfies the logic B. The logic B indicates that "authentication using an IC card and a PIN is performed." However, the history information does not indicate a result of authentication using an IC card and a PIN. Hence, the service provider system 21B determines that the history information does not satisfy the logic B, and rejects the login request received from the user terminal 13.

Figure 11A:
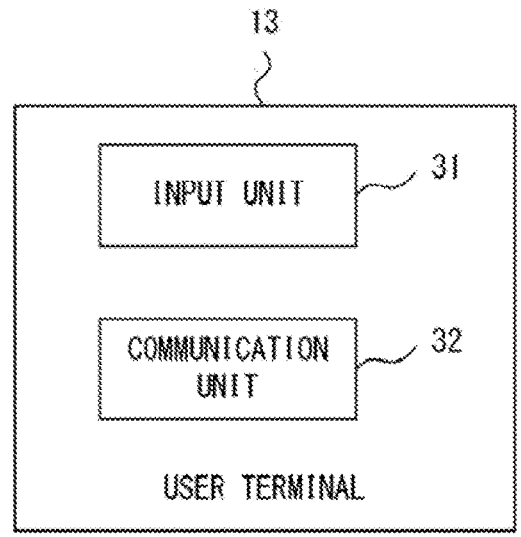
FIG. 11A illustrates an example of a user terminal.

FIG. 11A illustrates an example of the user terminal 13. The user terminal 13 includes an input unit 31 and a communication unit 32. Note that the user terminal 13 may have other functions that are not depicted in FIG. 11A. For example, the user terminal 13 may include a device for detecting the position of the user terminal 13 by using a GPS signal.

The input unit 31 processes user input. For example, the input unit 31 may be implemented by a keyboard (including software keyboard), a mouse, a touch panel, a camera, a microphone, and/or a sensor. The communication unit 32 provides an interface for connection to a network. Thus, the communication unit 32 can communicate with other communication devices (e.g., service provider system 21, authentication system 22) over the network.

Figure 11B:
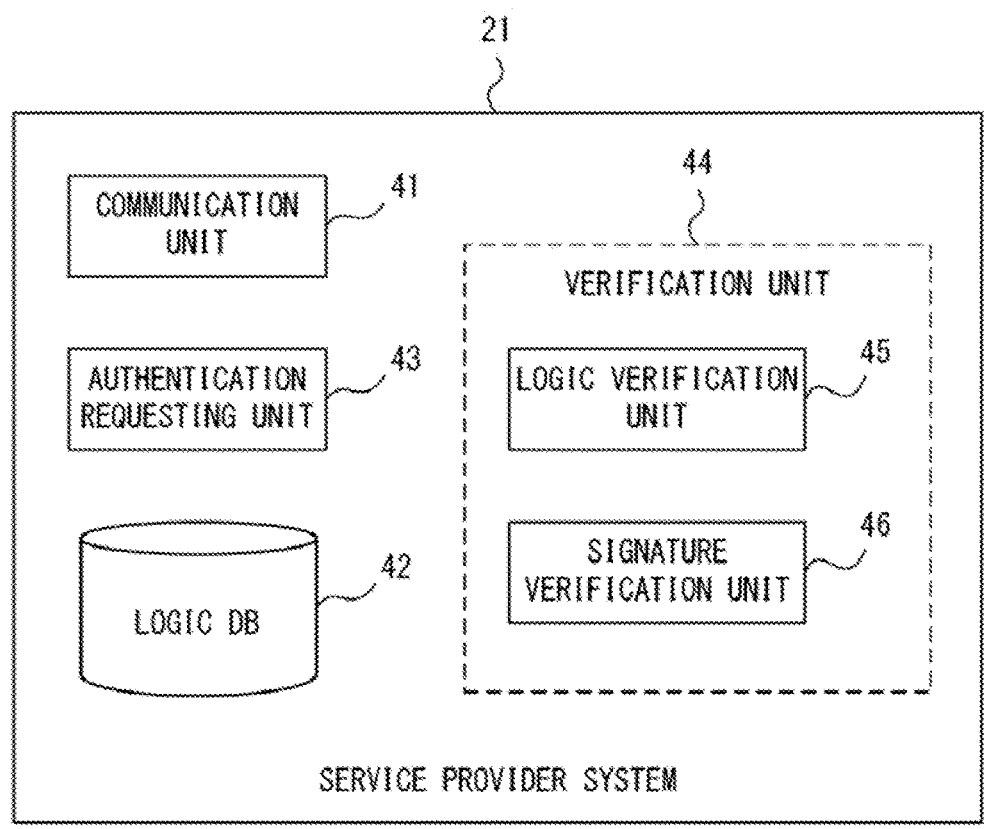
FIG. 11B illustrates an example of a service provider system.

FIG. 11B illustrates an example of the service provider system 21. The service provider system 21 includes a communication unit 41, a logic database 42, an authentication requesting unit 43, and a verification unit 44. Note that the service provider system 21 may have other functions that are not depicted in FIG. 11B.

The communication unit 41 provides an interface for connection to a network. Thus, the communication unit 41 can communicate with other communication devices (e.g., user terminal 13, authentication system 22) over the network. As depicted in FIG. 12, for each service provided by the service provider system 21, a logical description (i.e., logic) describing an authentication policy is stored in the logic database 42. For example, the logic may be described in a text form. When the service provider system 21 receives a login request, the authentication requesting unit 43 refers to the logic database 42 so as to generate an authentication request. For example, when a login request for use of a mail service is received, the authentication requesting unit 43 may extract a logic corresponding to a "Mail" from the logic database 42. Then, the authentication requesting unit 43 generates an authentication request including the extracted logic.

The verification unit 44 includes a logic verification unit 45 and a signature verification unit 46. When the service provider system 21 receives a token from a user terminal, the logic verification unit 45 verifies whether history information attached to the token satisfies a corresponding logic. The signature verification unit 46 verifies whether the token has been signed by an authentication system determined in advance. The service provider system 21 accepts the login request when the history information satisfies the logic and a specified signature is detected. Thus, the service provider system 21 provides a service to the user terminal.

Figure 13:
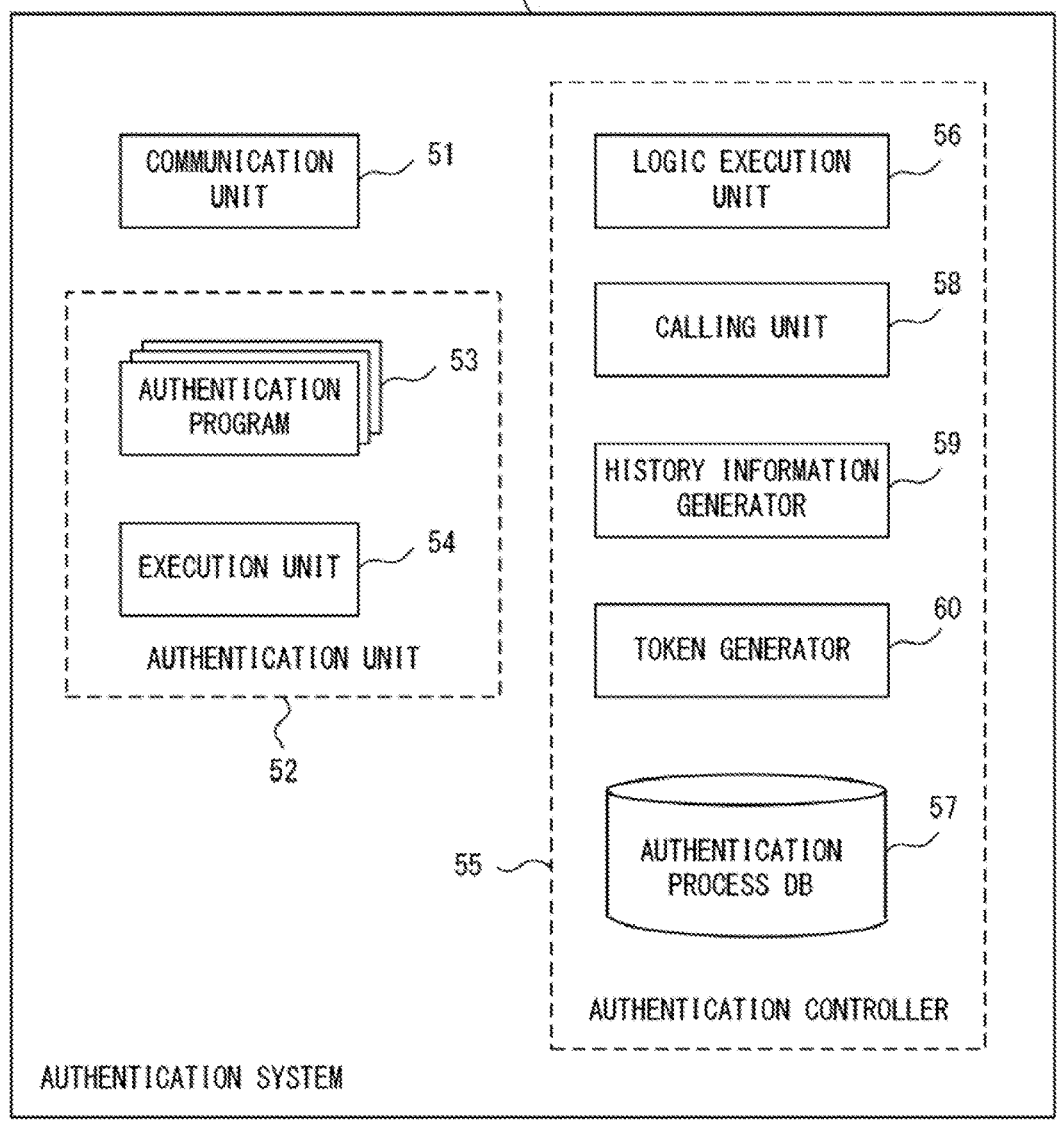
FIG. 13 illustrates an example of an authentication system.

FIG. 13 illustrates an example of the authentication system 22. The authentication system 22 includes a communication unit 51, an authentication unit 52, and an authentication controller 55. Note that the authentication system 22 may have other functions that are not depicted in FIG. 13.

The communication unit 51 provides an interface for connection to a network. Thus, the communication unit 51 can communicate with other communication devices (e.g., user terminal 13, service provider system 21) over the network.

The authentication unit 52 includes an authentication program 53 and an execution unit 54. The authentication program 53 is a program code describing a procedure of user authentication. The authentication unit 52 may include a plurality of authentication programs 53. The execution unit 54 executes an authentication program 53 designated by the authentication controller 55.

The authentication controller 55 includes a logic execution unit 56, an authentication process database 57, a calling unit 58, a history information generator 59, and a token generator 60. The logic execution unit 56 specifies, based on a logic included in an authentication request, authentication elements requested by a service provider system 21. In this example, authentication elements include authentication conditions and authentication methods. As indicated in FIG. 14, the authentication process database 57 manages, for each authentication element, a location at which an authentication process is executed, and the name of an authentication program. "local" indicates that a corresponding authentication element can be executed in the authentication system 22. When a corresponding authentication element cannot be executed in the authentication system 20, "local" indicates a location at which a calculating machine for executing the authentication element is implemented. The calling unit 58 refers to the authentication process database 57 so as to specify a calculating machine for executing an authentication element, and makes a request for the specified calculating machine to execute user authentication.

The history information generator 59 generates history information indicating a result of user authentication. The token generator 60 generates a token by adding a signature to data including the history information. That is, a token to which the history information has been attached is generated. Then, the communication unit 51 transmits the token generated by the authentication controller 55 to the user terminal 13.

Figure 15C:
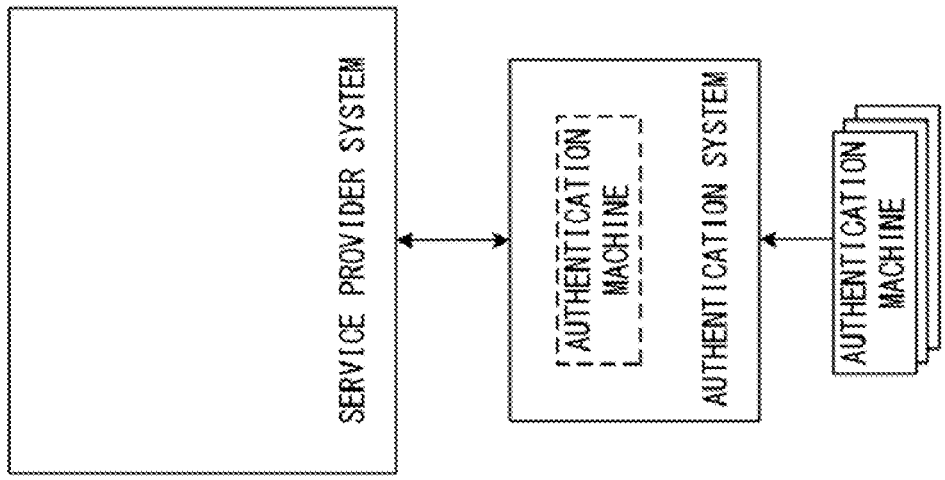
FIGS. 15A-15C illustrate configuration examples of an authentication system.
Figure 15B:
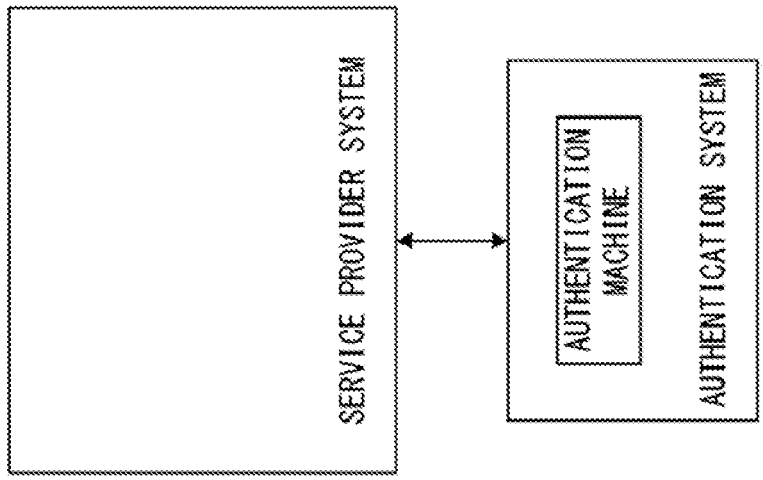
Figure 15A:
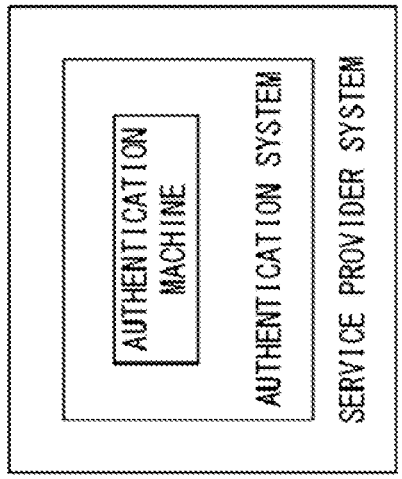

FIGS. 15A-15C illustrate configuration examples of the authentication system. For example, as depicted in FIG. 15A, the authentication system may be implemented in a service provider system. However, in this configuration, a service providing entity develops not only the service provider system but also the authentication system. Thus, if the service providing entity wishes to concentrate on the development of the service provider system, the development of the authentication system will be a large burden on the service providing entity.

In the configuration depicted in FIG. 15B, the authentication system is provided outside the service provider system. The practical use of this configuration has been progressed with the spread of OpenID Connect/SAML and Identity as a Service. However, authentication techniques have been progressively diversified and complicated in recent years. Hence, it is not easy for one company to cover all the authentication techniques.

In the configuration depicted in FIG. 15C, the authentication system is provided outside the service provider system, and in addition, authentication machines are provided outside the authentication system. For example, the authentication machines may correspond to the authentication unit 52 depicted in FIG. 13. In this case, the authentication system may be built using authentication machines of third parties. According to this configuration, the service provider system can use desired authentication policies by combining various authentication conditions and authentication methods. One or more authentication machines may be implemented in the authentication system. For example, the authentication system 22 depicted in FIG. 13 may include an authentication unit 52 operated as an authentication machine.

Figure 16:
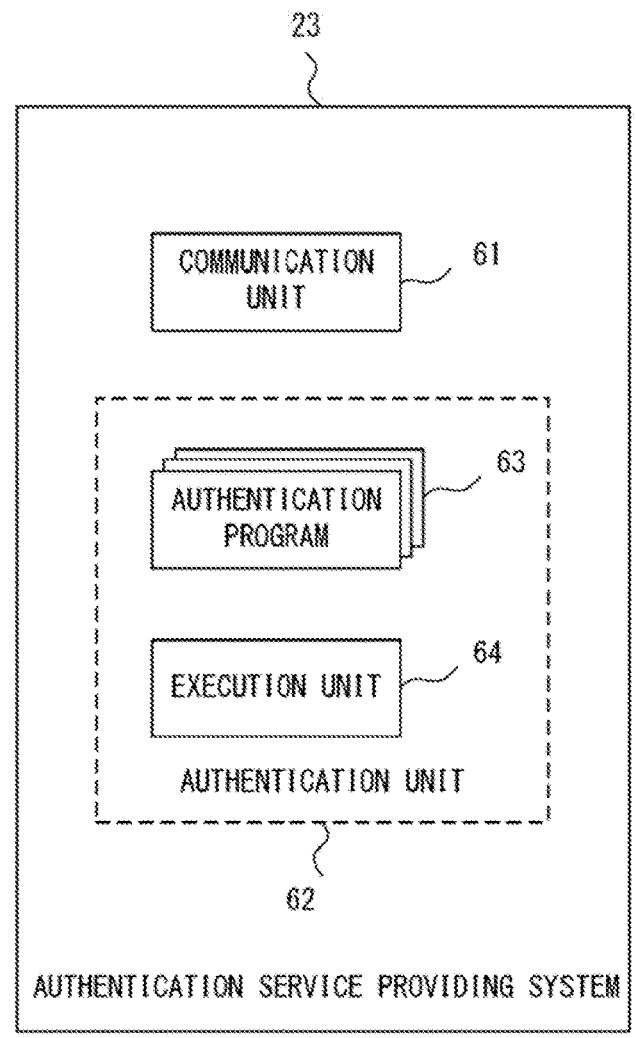
FIG. 16 illustrates an example of an authentication service providing system.

FIG. 16 illustrates an example of the authentication service providing system. An authentication service providing system 23 depicted in FIG. 16 corresponds to an authentication machine provided outside the authentication system in the example illustrated in FIG. 15C. The authentication service providing system 23 includes a communication unit 61 and an authentication unit 62. The communication unit 61 provides an interface for connection to a network. Thus, the communication unit 61 can communicate with other communication devices (e.g., authentication system 22) over the network. The authentication unit 62 includes authentication programs 63 and an execution unit 64. The authentication programs 63 and the execution unit 64 are substantially the same as the authentication programs 53 and the execution unit 54 implemented in the authentication system 22 depicted in FIG. 13, and descriptions of the authentication programs 63 and the execution unit 64 are omitted herein.

Figure 17:
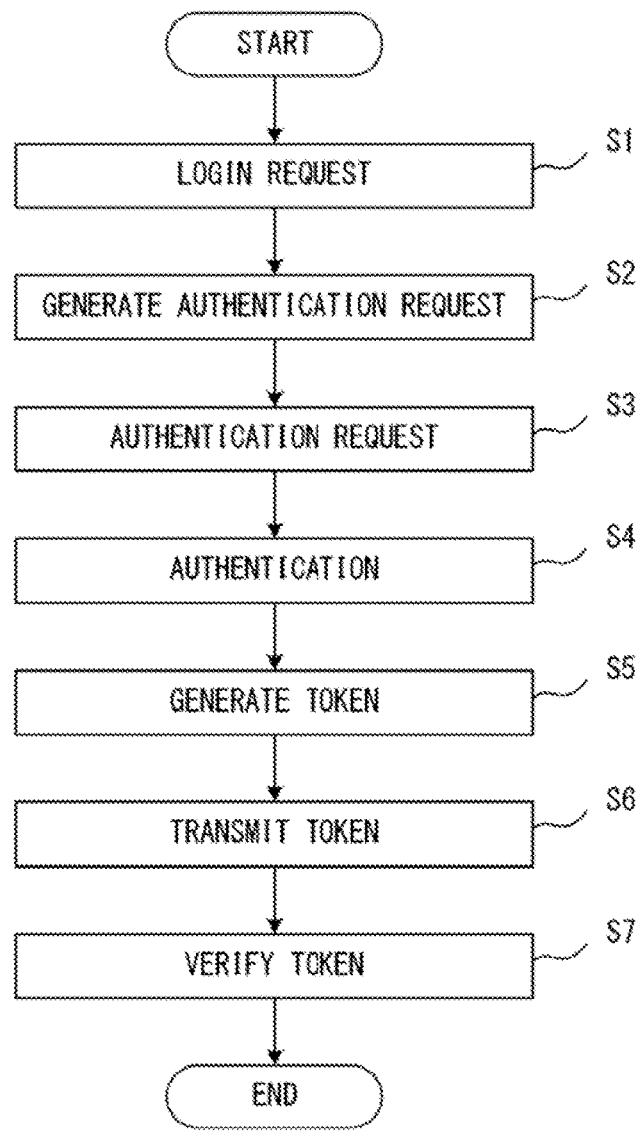
FIG. 17 is a flowchart illustrating an example of an authentication method in accordance with embodiments of the present invention.

FIG. 17 is a flowchart illustrating an example of an authentication method in accordance with embodiments of the present invention. For example, the processes of this flowchart may be executed by the user terminal 13, the service provider systems 21 (21A-21B), and the authentication system 22 depicted in FIG. 3. The processes of this flowchart start when a user logs in to a desired service provider system 21 by using the user terminal 13. Each of the service provider systems 21 has a logic indicating the policy of user authentication.

In S1, the user terminal 13 transmits a login request to a service provider system 21 designated by the user. In S2, the service provider system 21 that has received the login request generates an authentication request. The authentication request includes a logic indicating the authentication policy of the service provider system 21. The service provider system 21 transmits the authentication request to the user terminal 13. A forwarding request giving an instruction to forward the authentication request to the authentication system 22 has been added to the authentication request.

In S3, the user terminal 13, in response to the forwarding request, forwards the authentication request received from the service provider system 21 to the authentication system 22. The user terminal 13 also transmits authentication information of the user to the authentication system 22. In this case, the user terminal 13 transmits, to the authentication system 22, authentication information (e.g., password, fingerprints) input by the user in accordance with an authentication method.

The processes of S2-S3 can have various variations. For example, the service provider system 21 may transmit an authentication request to the authentication system 22 without the intervention of the user terminal 13. Meanwhile, when forwarding an authentication request received from the service provider system 21 to the authentication system 22, the user terminal 13 may obtain necessary authentication information based on the authentication request. In this case, the user terminal 13 may transmit the authentication information to the authentication system 22 together with the authentication request. Alternatively, when the authentication system 22 requests authentication information, the user terminal 13 may obtain the requested authentication information from the user and transmit the obtained authentication information to the authentication system 22.

In S4, the authentication system 22 executes, based on a logic included in the authentication request, an authentication process for the authentication information. In S5, the authentication system 22 generates history information indicating a result of the user authentication and generates a token. In this example, the history information is attached to the token. The authentication system 22 transmits, to the user terminal 13, the token to which the history information has been attached.

In S6, the user terminal 13 transmits the token to the desired service provider system 21. In the case of logging in to a plurality of service provider systems 21, the same token is transmitted to each of the service provider systems 21. In S7, the service provider systems 21 that have received the token each verify whether the history information added to the token satisfies the authentication policy of the service provider system 21. When the history information satisfies the authentication policy, the service provider system 21 accepts login.

Figure 18:
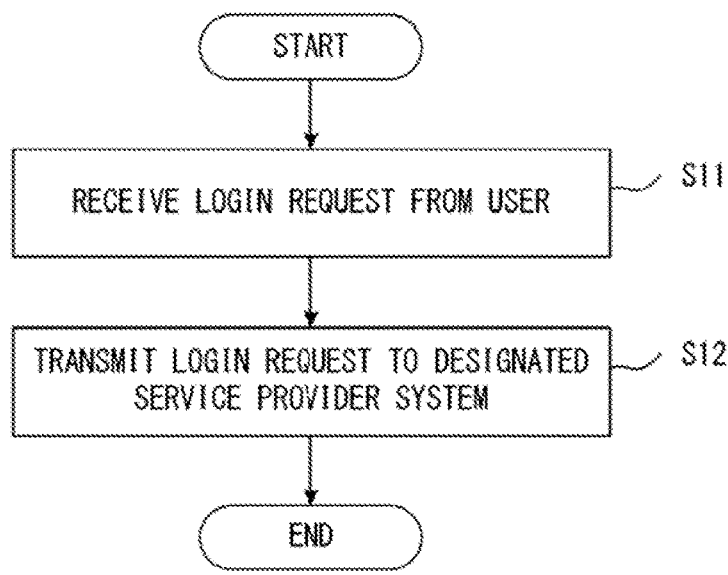
FIG. 18 is a flowchart illustrating an example of a process in which a user terminal transmits a login request.

FIG. 18 is a flowchart illustrating an example of a process in which the user terminal 13 transmits a login request. This process corresponds to S1 indicated in FIG. 17.

In S11, the input unit 31 depicted in FIG. 11A receives, from a user, a login request for a service provider system 21. Then, the input unit 31 forwards the login request to the communication unit 32. The login request includes identification information identifying a service designated by the user (or the service provider system 21 that the user attempts to log in). In S12, the communication unit 32 transmits the login request to a service provider system 21 designated by the user. In the example depicted in FIG. 3, the login request is transmitted to the service provider system 21A.

Figure 19:
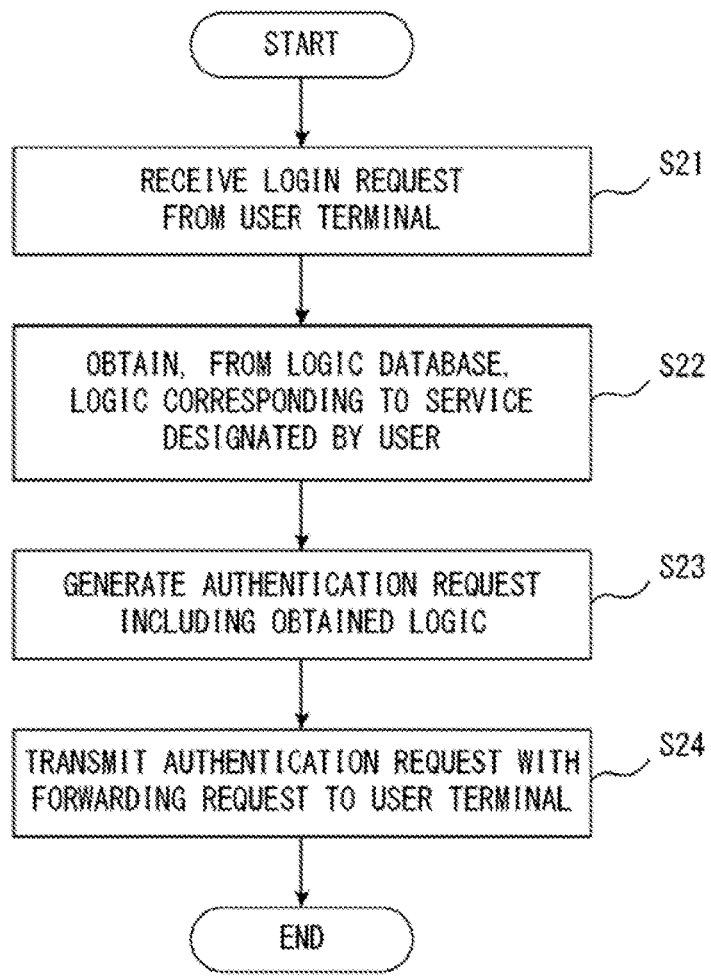
FIG. 19 is a flowchart illustrating an example of a process in which a service provider system generates an authentication request in response to a login request.

FIG. 19 is a flowchart illustrating an example of a process in which a service provider system 21 generates an authentication request in response to a login request. This process corresponds to S2 indicated in FIG. 17.

In S21, the communication unit 41 depicted in FIG. 11B receives a login request transmitted from the user terminal 13. The login request is forwarded from the communication unit 41 to the authentication requesting unit 43. In S22, the authentication requesting unit 43 obtains, based on the login request, a logic corresponding to a service designated by the user from the logic database 42. For each service provided by the service provider system 31, a logic indicating an authentication policy is registered in the logic database 42. For example, each logic may be text data describing an authentication policy.

In S23, the authentication requesting unit 43 generates an authentication request including the obtained logic. For example, the authentication request may include a message or command requesting that the authentication system 22 execute the logic. In S24, the communication unit 41 attaches a forwarding request to the authentication request. The forwarding request gives an instruction to redirect the authentication request to the authentication system 22. The communication unit 41 transmits the authentication request to which the forwarding request has been attached to the source of the login request (i.e., the user terminal 13).

Figure 20:
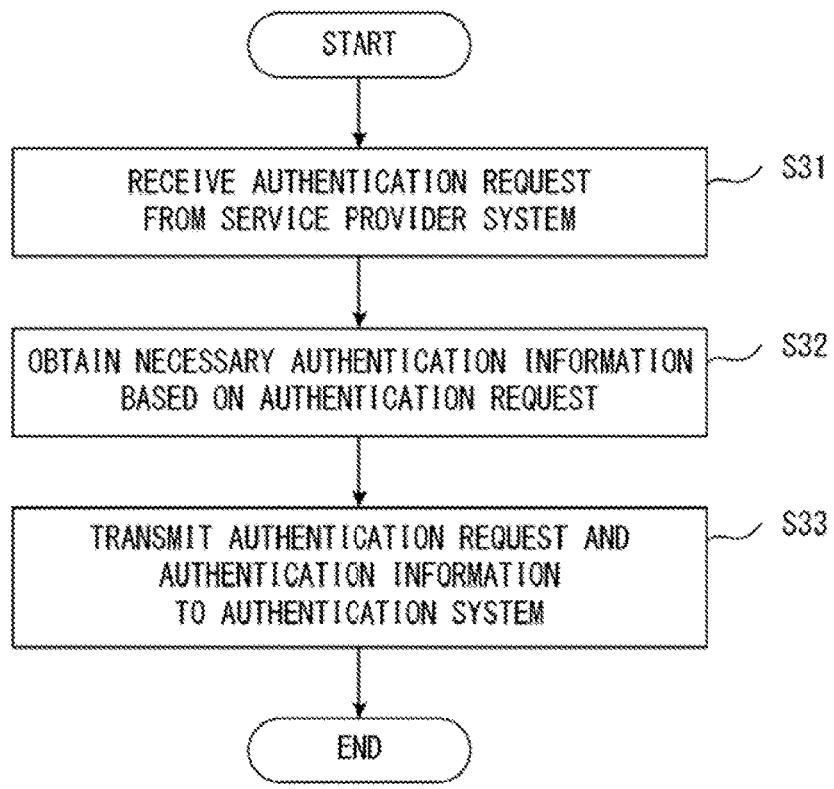
FIG. 20 is a flowchart illustrating an example of a process in which a user terminal forwards an authentication request to an authentication system.

FIG. 20 is a flowchart illustrating an example of a process in which the user terminal 13 forwards an authentication request to the authentication system 22. This process corresponds to S3 indicated in FIG. 17.

In S31, the communication unit 32 depicted in FIG. 11A receives, from a service provider system 21, an authentication request to which a forwarding request has been attached. In S32, the user terminal 13 refers to a logic included in the authentication request and obtains authentication information necessary for user authentication. The user terminal 13 requests, as necessary, that the user input authentication information. For example, when a password is necessary for user authentication, a screen for inputting the password may be displayed on a display device of the user terminal 13. In S33, the communication unit 32 forwards, in accordance with the forwarding request, the authentication request to the authentication system 22 and transmits the authentication information to the authentication system 22.

Figure 21:
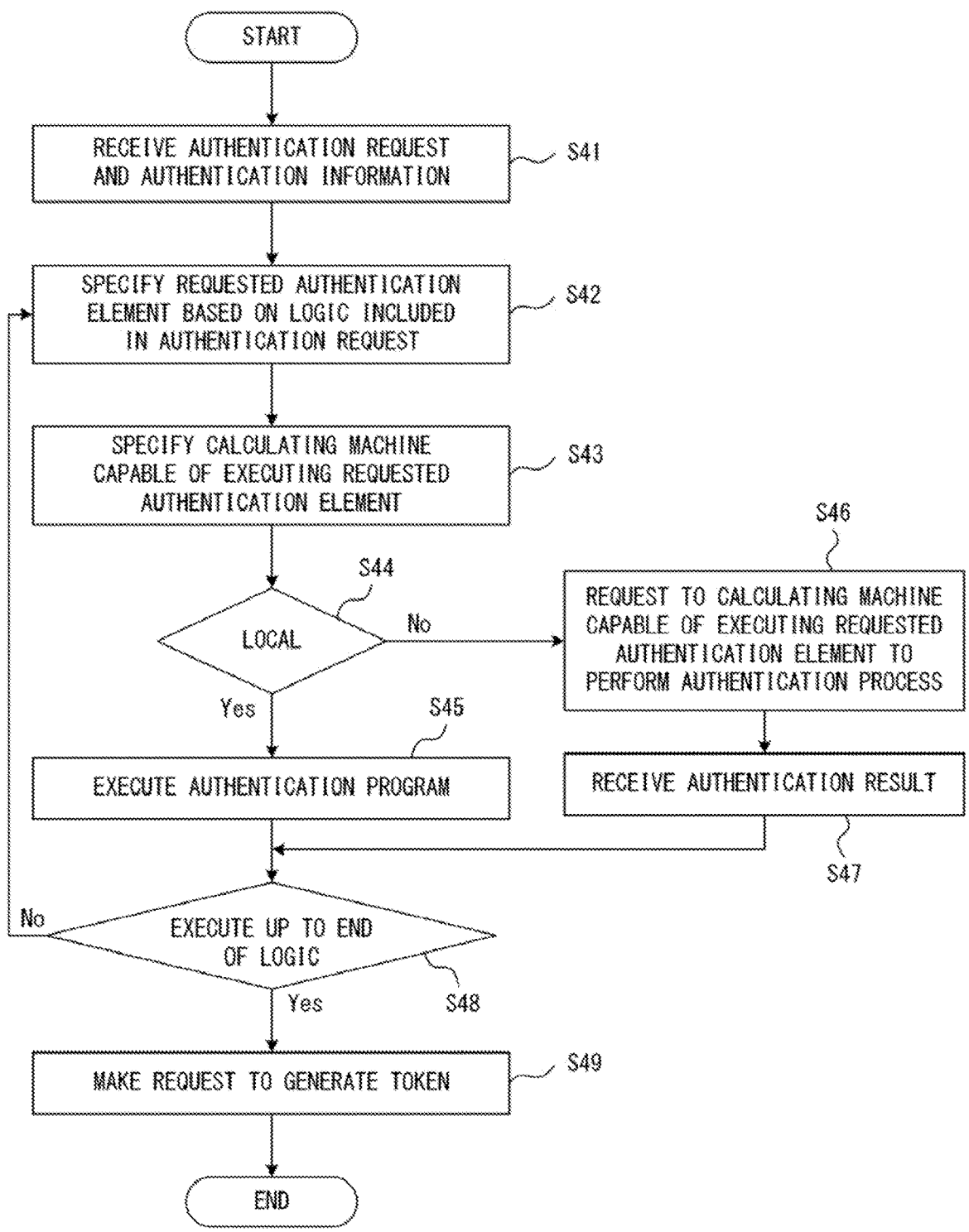
FIG. 21 is a flowchart illustrating an example of user authentication performed by an authentication system.

FIG. 21 is a flowchart illustrating an example of user authentication executed by the authentication system 22. This process corresponds to S4 indicated in FIG. 17.

In S41, the communication unit 51 depicted in FIG. 13 receives an authentication request and authentication information transmitted from the user terminal 13. The authentication request and the authentication information are forwarded from the communication unit 51 to the logic execution unit 56. In this case, the communication unit 51 makes a request for the logic execution unit 56 to execute a logic included in the authentication request.

In S42, the logic execution unit 56 executes the logic included in the authentication request. Specifically, the logic execution unit 56 specifies, based on the logic included in the authentication request, one or more authentication elements requested by a service provider system 21. In S43-S44, the calling unit 58 refers to the authentication process database 57 and specifies, for each of the authentication elements specified by the logic execution unit 56, a calculating machine that can execute an authentication process corresponding to the authentication element. As indicated in FIG. 14, the authentication process database 57 manages, for each authentication element, a location at which an authentication process is executed, and the name of an authentication program.

When the authentication unit 52 implemented in the authentication system 22 is capable of executing an authentication process, the calling unit 58 makes, in S45, a request for the authentication unit 52 to execute the authentication process. In this case, the calling unit 58 designates an authentication program to be executed, and forwards the authentication information received from the user terminal 13 to the authentication unit 52. The authentication unit 52 executes the requested authentication process. Specifically, the execution unit 54 executes a designated authentication program 53 for the authentication information received from the user terminal 13. Then, the authentication unit 52 outputs an authentication result (true or false). The authentication result is sent to the logic execution unit 56.

When the authentication unit 52 implemented in the authentication system 22 is incapable of executing an authentication process, the calling unit 58 makes, in S46, a request for a calculating machine specified by the logic execution unit 56 (e.g., the authentication service providing system 23 depicted in FIG. 16) to execute the authentication process. In this case, the communication unit 51 transmits the execution request for the authentication process to the authentication service providing system 23. In response to this, the authentication service providing system 23 executes the authentication process. In S47, the communication unit 51 receives an authentication result provided by the authentication service providing system 23. The authentication result is sent to the logic execution unit 56.

The processes of S42-S47 are executed for each authentication element requested by the service provider system 21. Thus, the logic execution unit 56 decides, in S48, whether there remain any authentication elements for which the processes have not been executed yet. When there remains an authentication element for which the processes have not been executed yet, the processes of the logic execution unit 56 return to S42. Accordingly, the processes of S42-S47 are repeatably executed until corresponding authentication processes are executed for all the authentication elements. When corresponding authentication processes have been executed for all the authentication elements, the logic execution unit 56 makes, in 49, a request for the token generator 60 to generate a token.

Figure 22:
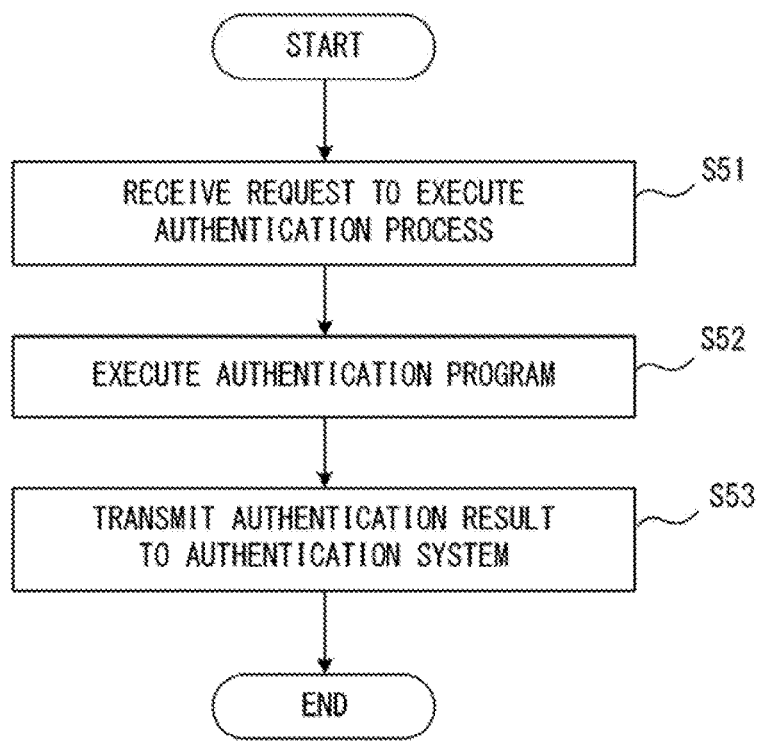
FIG. 22 is a flowchart illustrating an example of user authentication performed by an authentication service providing system.

FIG. 22 is a flowchart illustrating an example of user authentication performed by the authentication service providing system 23. This process corresponds to a portion of S4 indicated in FIG. 17. This process is executed when being invoked by the authentication system 22.

In S51, the communication unit 61 depicted in FIG. 16 receives an execution request for an authentication process from the authentication system 22. The execution request is transmitted from the authentication system 22 in S46 in FIG. 21. In S52, the authentication unit 62 executes the requested authentication process. Specifically, the execution unit 64 executes a designated authentication program 63 for authentication information received from the user terminal 13. Then, the authentication unit 62 outputs an authentication result (true or false). In S53, the communication unit 61 transmits the authentication result to the authentication system 22. The execution result is received by the authentication system 22 in S47 in FIG. 21.

Figure 23:
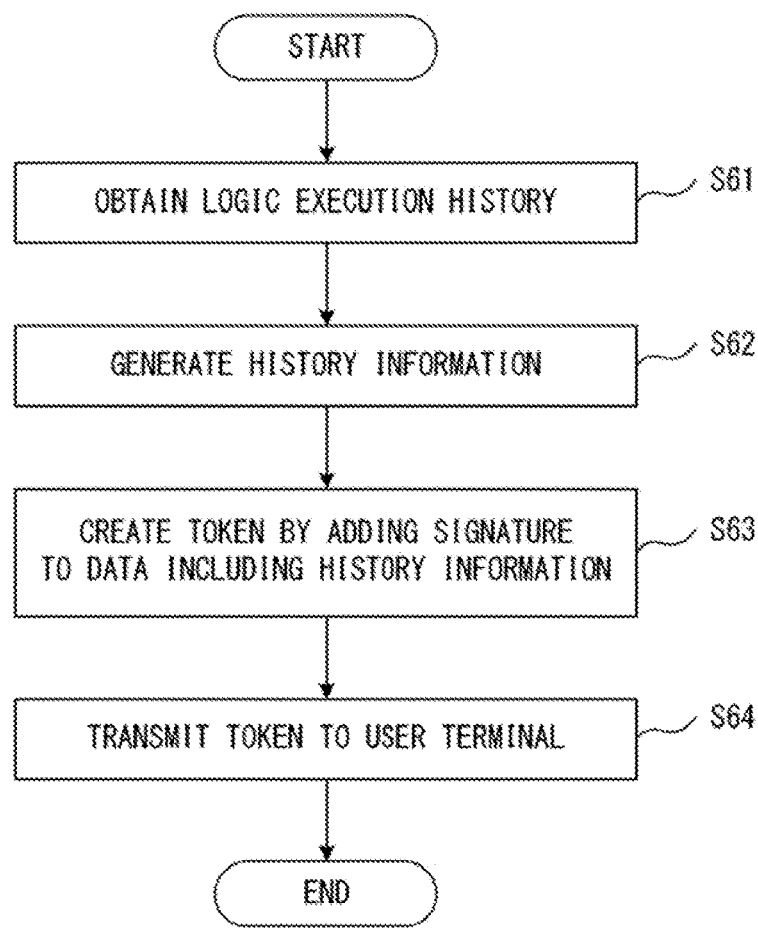
FIG. 23 is a flowchart illustrating an example of a process in which an authentication system generates a token.

FIG. 23 is a flowchart illustrating an example of a process in which the authentication system 22 generates a token. This process corresponds to S5 indicated in FIG. 17.

In S61, the history information generator 59 depicted in FIG. 13 obtains a logic execution history from the logic execution unit 56. The logic execution history includes an authentication result provided by the authentication unit 52 and/or the authentication service providing system 23. In S62, the history information generator 59 generates history information based on the logic execution history. As indicated in FIG. 5, the history information indicates, for each authentication element, an authentication result and a time at which an authentication process was executed. The authentication results provided for the respective authentication elements are preferably arranged in a chronological order.

In S63, the token generator 60 creates a token by adding a signature identifying the authentication system 22 to data including the history information. The signature may be generated using a private key for cryptographic communication. In S64, the communication unit 51 transmits the token to the user terminal 13. The user terminal 13 can transmit the token to one or more desired service provider systems 21 that the user wishes to log in to.

Figure 24:
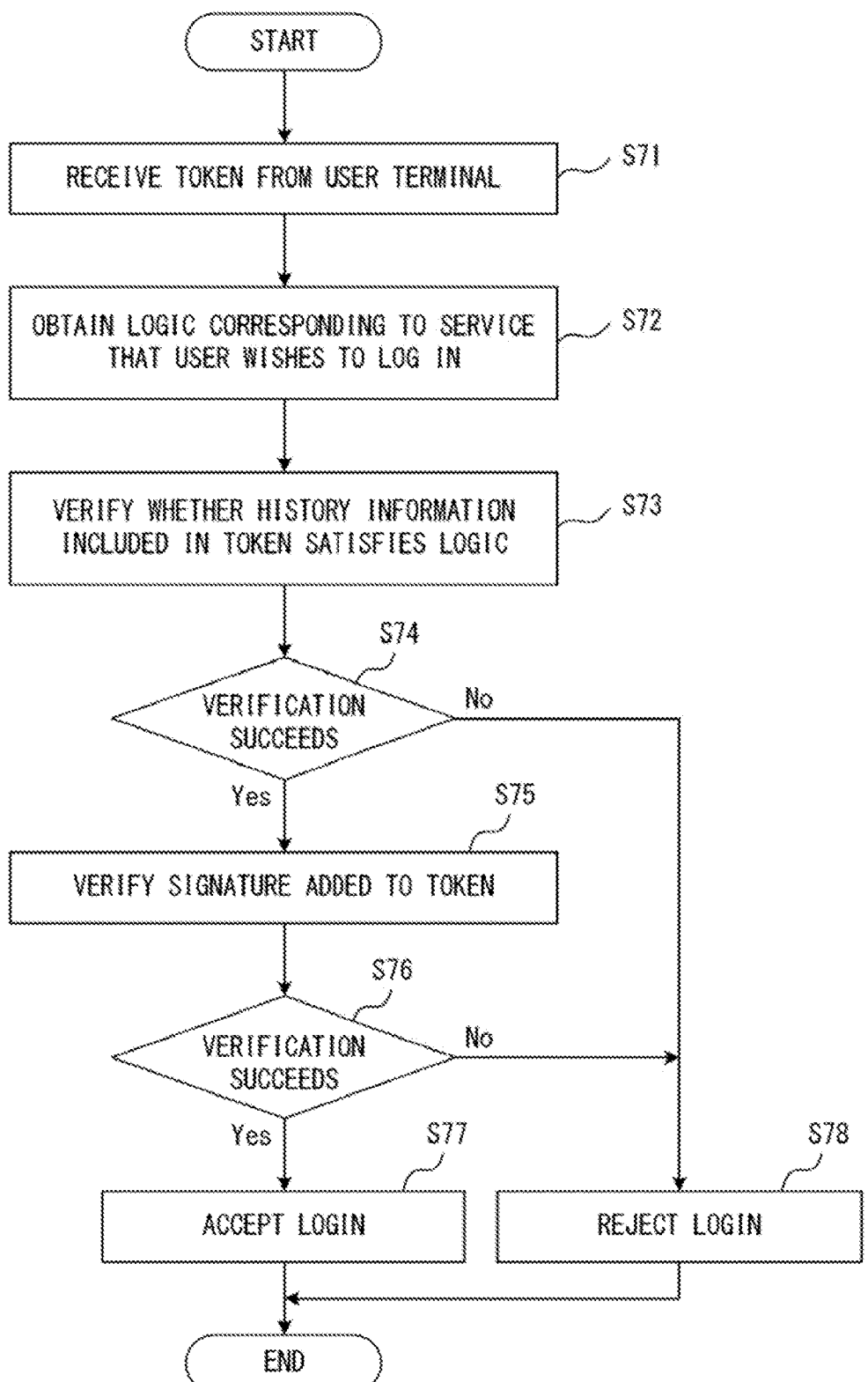
FIG. 24 is a flowchart illustrating an example of token verification performed by each of service provider systems.

FIG. 24 is a flowchart illustrating an example of token verification performed by each of the service provider systems 21. This process corresponds to S7 indicated in FIG. 17.

In S71, the communication unit 41 depicted in FIG. 11B receives a token transmitted from the user terminal 13. As described above, the token includes history information indicating a result of user authentication, and the signature of the authentication system 22 has been added to the token. The token is forwarded to the verification unit 44. In S72, the logic verification unit 45 obtains, from the logic database 42, a logic corresponding to a service the user wishes to log in. As depicted in FIG. 12, the logic database 42 manages, for each service, a logic describing an authentication policy.

In S73-S74, the logic verification unit 45 verifies whether the history information included in the token satisfies a corresponding logic. When a logic includes an authentication condition and an authentication method, the verification is performed for the combination of the authentication condition and the authentication method. When a logic includes a plurality of authentication elements, the verification is performed for each of the authentication elements.

In S75-S76, the signature verification unit 46 verifies the signature added to the token. For example, the signature verification unit 46 may verify whether the token has been generated by a reliable authentication system. When the verification of the logic succeeds and the verification of the signature also succeeds, the service provider system 21 accepts the login request received from the user terminal 13. If at least either the verification of the logic or the verification of the signature fails, the service provider system 21 rejects the login request received from the user terminal 13. Note that the verification unit 44 may execute S75-S76 before S73-S74.

The following describes the procedure of the flowcharts illustrated in FIGS. 21 and 23 by referring to the example illustrated in FIGS. 8-9. In response to a login request received from the user terminal 13, the service provider system 21A generates an authentication request including the following logic.

"If OnSite then
IDandPassword;
else
ICCard;
PIN"

This logic indicates that "authentication is performed using an ID and a password when the user is located in the site of the company, and authentication is performed using an IC card and a PIN when the user is located outside the site of the company." Meanwhile, the position information of the user terminal 13, a user ID, and a password are transmitted from the user terminal 13 to the authentication system 22 as authentication information.

Upon receipt of an authentication request including the logic, the authentication system 22 executes S41-S49 indicated in FIG. 21. In particular, in S42, the logic execution unit 56 detects the following four authentication elements by analyzing the received logic.

Authentication element A1: To decide whether the user is located in the site of the company
Authentication element A2: To decide whether the pair of a user ID and a password is correct
Authentication element A3: To decide whether the identification information of an IC card has been registered
Authentication element A4: To decide whether a PIN has been registered The logic execution unit 56 also recognizes that the authentication element A2 is to be executed when a decision of "true" is obtained for the authentication element A1 and that the authentication elements A3-A4 are to be executed when a decision of "false" is obtained for the authentication element A1.

In S43-S44, the calling unit 58 refers to the authentication process database 57 and specifies a calculating machine that can execute the authentication process corresponding to the authentication element A1. In this example, the authentication unit 52 implemented in the authentication system 22 can execute the authentication process corresponding to the authentication element A1. In this base, in S45, the authentication unit 52 decides, based on the position information received from the user terminal 13, whether the user is located in the site of the company. This example is based on the assumption that the user is located in the site of the company. Thus, "OnSite=true" is obtained as an authentication result corresponding to the authentication element A1. The authentication result is sent to the logic execution unit 56. Subsequently, the process of the authentication system 22 returns to S42.

Upon recognizing that the authentication result of "true" has been obtained for the authentication element A1, the logic execution unit 56 extracts the authentication element A2 in S42. In S43-S44, the calling unit 58 refers to the authentication process database 57 and specifies a calculating machine that can execute the authentication process corresponding to the authentication element A2. In this example, the authentication unit 52 implemented in the authentication system 22 can perform the authentication process corresponding to the authentication element A2. In this base, in S45, the authentication unit 52 decides whether the pair of the user ID and the password received from the user terminal 13 is correct. This example is based on the assumption that the pair of the user ID and the password is correct. Thus, "IDandPassword=true" is obtained as an authentication result corresponding to the authentication element A2. The authentication result is sent to the logic execution unit 56.

According to the logic in this example, when the authentication process corresponding to the authentication element A2 is executed, the authentication processes corresponding to the authentication elements A3-A4 are not executed. Thus, the logic execution unit 56 ends the repetitive processes of S42-S47 and makes, in S49, a request for the token generator 60 to generate a token.

Upon the token generator 60 receiving the token generation request from the logic execution unit 56, the history information generator 59 obtains, in S61, an authentication result provided by the authentication unit 52 (i.e., the logic execution history of the logic execution unit 56). In S62, the history information generator 59 generates history information indicating the authentication result. In this example, as indicated in FIG. 9, the history information indicates an authentication result and an authentication time for each authentication element. In S63, the token generator 60 creates a token by adding a signature to data including the history information. In this example, a token such as that indicated in FIG. 10 is created. Then, in S64, the communication unit 51 transmits the token to the user terminal 13.

According to the current single sign-on authentication, in many cases, a system that has received an authentication request (i.e., authentication system) executes authentication. In this situation, available authentication methods are dependent on how the authentication system is implemented. Thus, in a case where various types of or strengths of authentication need to be performed, it is difficult for one authentication system to provide all the authentication methods. In the meantime, configurations have started to be widespread in which portions of the function of a computer system are implemented outside the system (X as a Service, API Mashup). Meanwhile, use and utilization of data owned by persons or companies have been increasingly attracting attention. Thus, it is considered that, in the future, services satisfying desired requirements will be required to be built by utilizing external services or data well.

In view of such technical problems and technical trends, authentication systems are preferably capable of providing various authentication methods by using external services or data. Embodiments of the present invention can solve problems such as the problem of how to combine authentication methods in an authentication system using a third party and the problem of how to verity execution results in the authentication system.

In addition, embodiments of the present invention allow personal information owned by a service providing entity to be used as authentication information. For example, information owned by a communication carrier, such as information pertaining to the positions and movements of subscribers, and information owned by a financial institution, such as information for strict identity verification, can be used as authentication information. Thus, embodiments of the present invention are considered to be useful for business pertaining to data use and utilization.

Variations

When the authentication policy of a service provider system 21 includes a plurality of authentication elements, the authentication system 22 tends to have a decreased rate of operation of a logic. Assume, for example, that: the authentication policy includes authentication elements A1-A2; the failure rate of an authentication machine B1 corresponding to the authentication element A1 is 0.1; and the failure rate of an authentication machine B2 corresponding to the authentication element A2 is 0.2. In this case, the rate of operation of the logic is 0.72 since the rates of operation of the authentication machines B1 and B2 are respectively 0.9 and 0.8. Note that failures of an authentication machine are not limited to an abnormality in the authentication machine, but include abnormalities of cases where the authentication machine cannot be supplied with appropriate authentication information and thus cannot execute an appropriate authentication process.

In variations of embodiments of the present invention, in order to alleviate the problem, alternative authentication elements can be established for one or more authentication elements included in an authentication policy. The alternative authentication elements are established by a service provider system 21 and described in an alternative list. For example, the alternative list may be reported in advance from the service provider system 21 to the authentication system 22. However, the alternative list may be transmitted to the authentication system 22 together with an authentication request.

For example, the alternative list may indicate a pair of an authentication element and an alternative authentication element as follows.

Alternative list: OnSite=OnSite2

In this example, "OnSite" decides whether a user is located in a specified area by using the Global Positioning System (GPS). "OnSite2" decides whether the user is located in a specified area by using base station information of cellular communication. When calculating machines for executing authentication processes corresponding to authentication elements are known, the alternative list may include information identifying the calculating machines.

When performing an authentication process in accordance with an authentication request, the authentication system 22 refers to an alternative list as necessary. For example, when an authentication process corresponding to a certain authentication element cannot be performed, the authentication system 22 may decide, by referring to the alternative list, whether an alternative authentication element has been established for the authentication element. When an alternative authentication element has been established, the authentication system 22 implements user authentication by executing an authentication process corresponding to the alternative authentication element.

Figure 25:
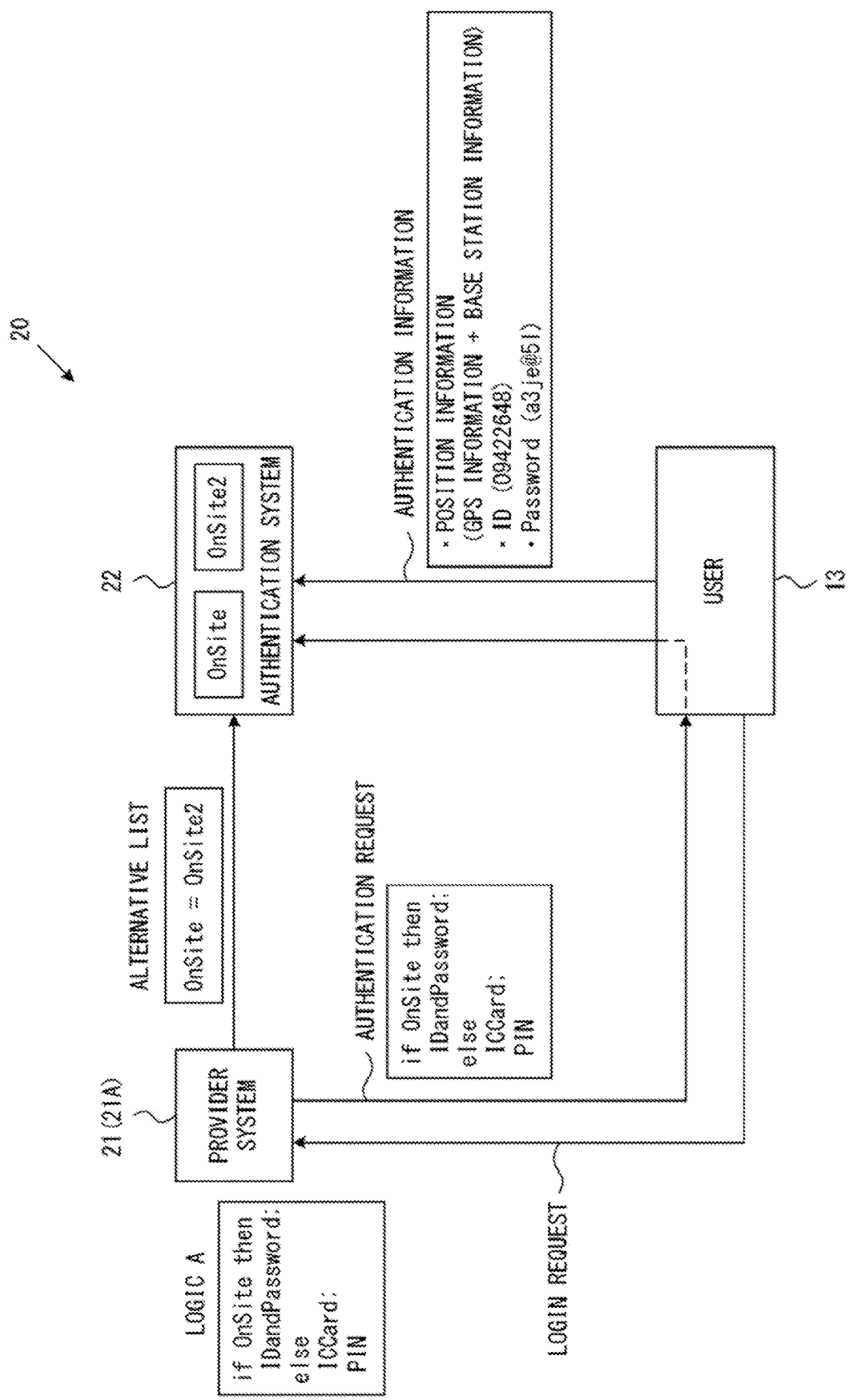
FIGS. 25-28 illustrate an example of authentication procedures in variations of embodiments of the present invention.

FIGS. 25-28 illustrate an example of authentication procedures in variations of embodiments of the present invention. In this example, as depicted in FIG. 25, an alternative list indicates that "OnSite2" may be used as a substitute for "OnSite". The authentication system 22 can execute authentication processes corresponding to "OnSite" and "OnSite2".

The authentication request and the authentication information received by the authentication system 22 in FIG. 25 are substantially the same as those in FIG. 8. However, in this example, position information indicating the position of the user terminal 13 includes GPS information and base station information. The base station information identifies a base station to which the user terminal is connected.

Figure 26:
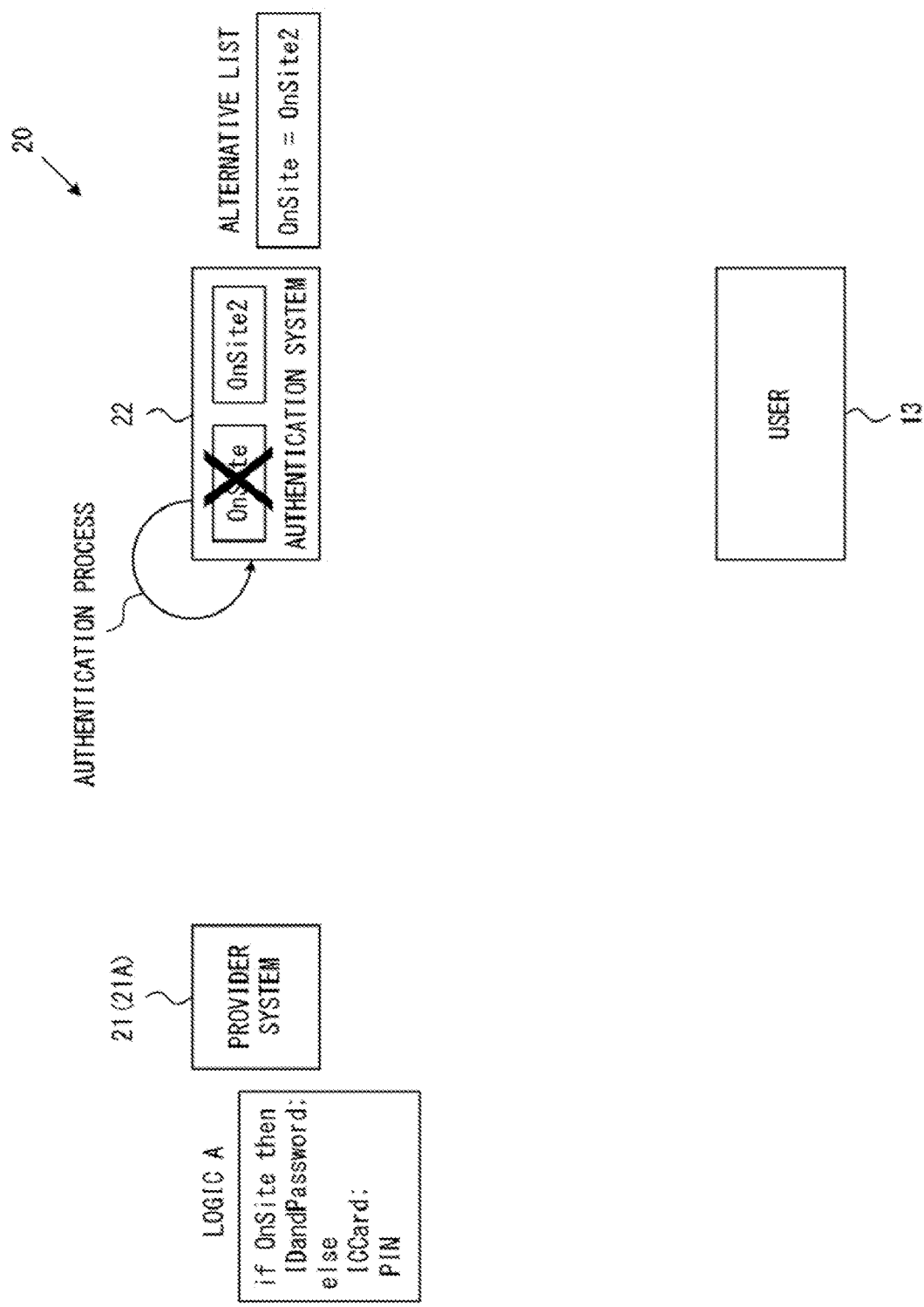

The authentication system 22 executes user authentication in response to an authentication request. However, in this example, the authentication system 22 cannot execute an authentication process corresponding to "OnSite", as indicated in FIG. 26. In this case, by referring to the alternative list, the authentication system 22 recognizes that "OnSite2" may be used as a substitute for "OnSite". Thus, the authentication system 22 executes an authentication process corresponding to "OnSite2" in the procedure of executing a logic included in the authentication request. In particular, the authentication system 22 decides, based on the base station information of the user terminal 13, whether the user is located in a specified area.

Figure 27:
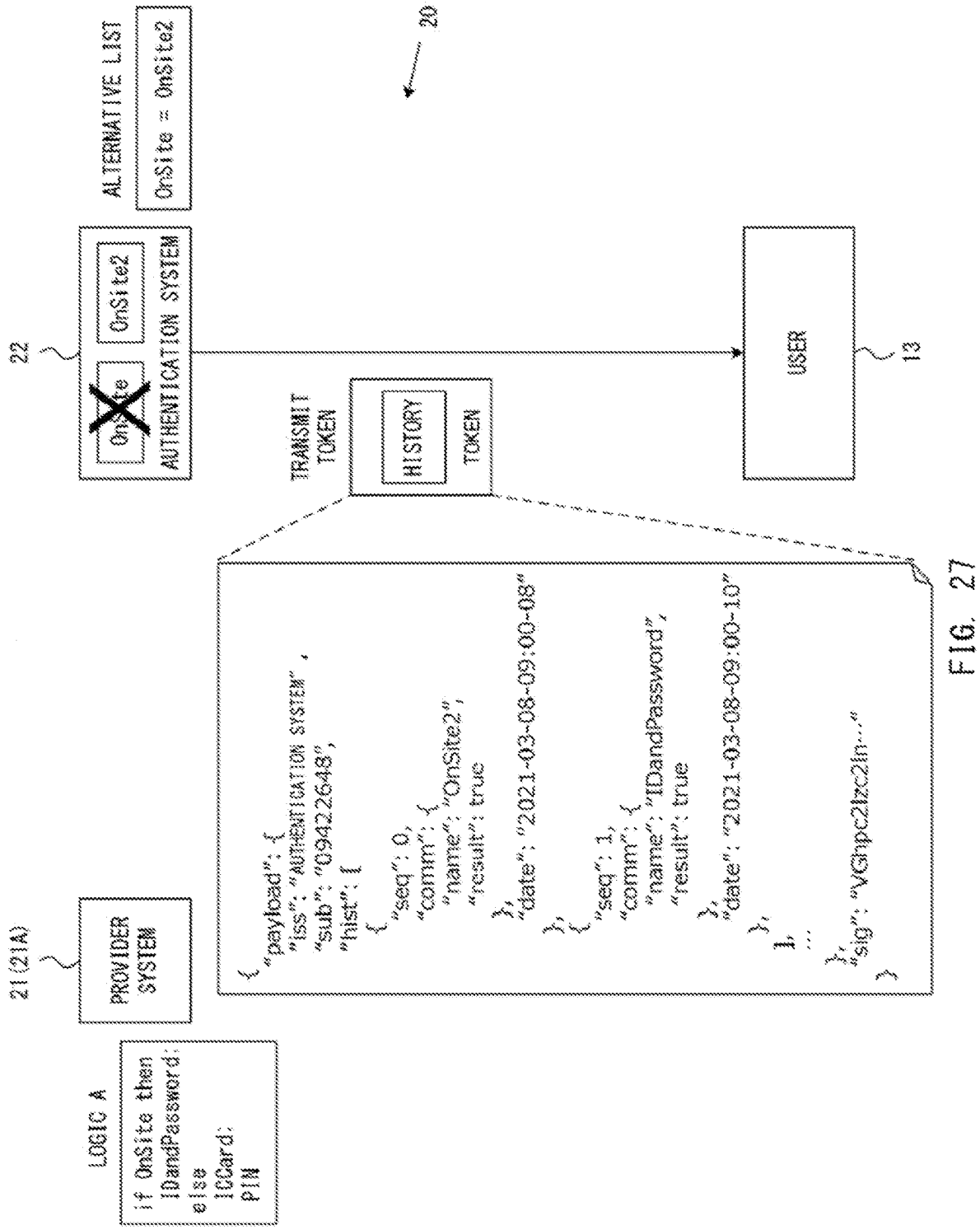
Figure 28:
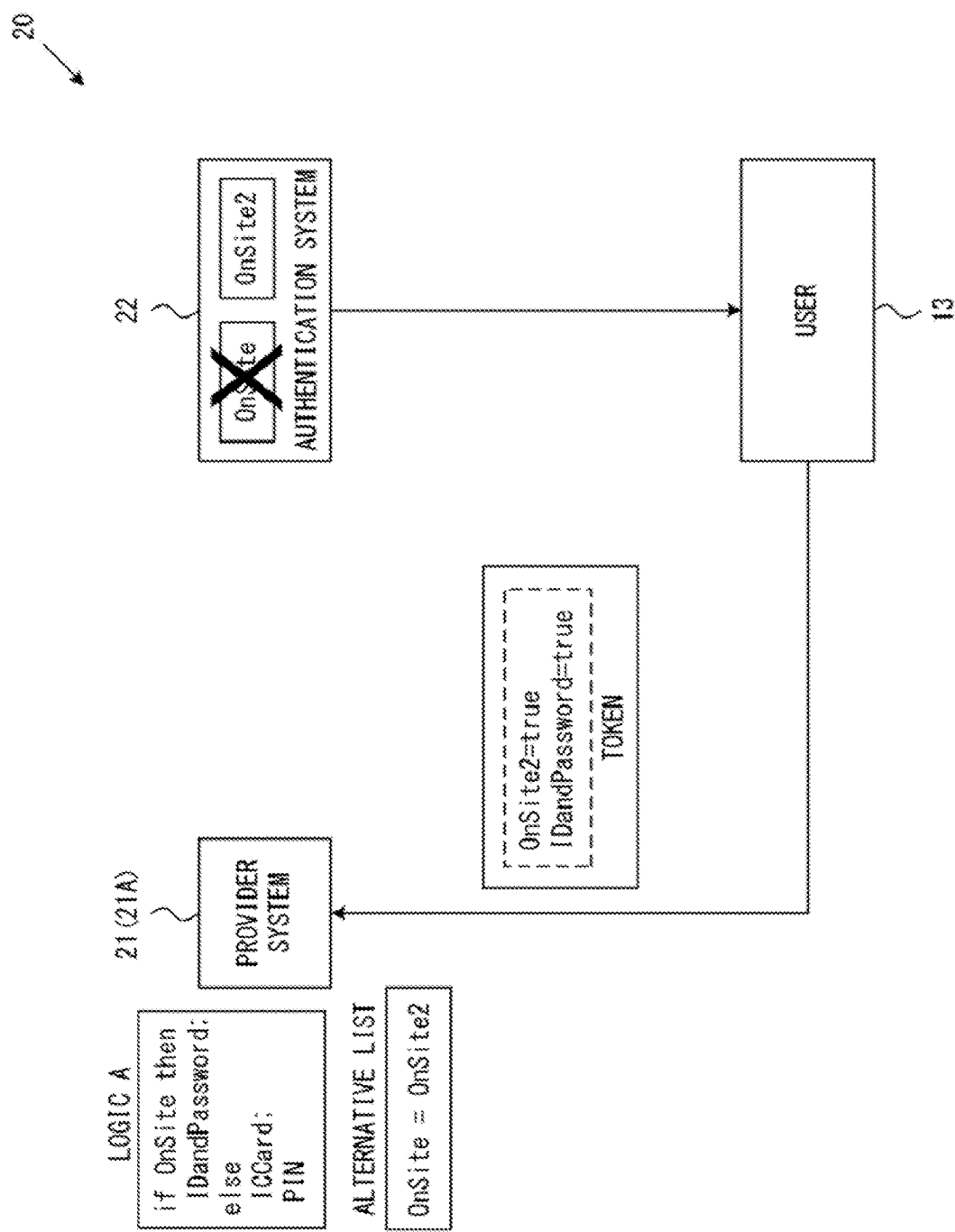

As depicted in FIG. 27, the authentication system 22 generates history information indicating authentication results. Furthermore, the authentication system 22 generates a token by adding a signature to data including the history information. In this example, the history information includes "OnSite2=true" and "IDandPassword=true". The authentication system 22 transmits the token to the user terminal 13.

The user terminal 13 transmits the token to a service provider system 21 that the user wishes to log in. In the example depicted in FIG. 28, the user terminal 13 transmits the token to the service provider system 21A. Thus, the service provider system 21A verifies the token based on a logic A describing the authentication policy of the service provider system 21A. In this case, the service provider system 21A verifies the token in consideration of the alternative list. Specifically, the following verification is performed.

The logic A accepts login when "OnSite=true" and "IDandPassword=true" are satisfied. In this regard, the history information attached to the token includes "OnSite2=true" and "IDandPassword=true". Thus, the history information does not satisfy the logic A. However, the alternative list indicates "OnSite=OnSite2". Hence, in view of the alternative list, the history information satisfies the logic A. In this case, the service provider system 21A accepts the login of the user terminal 13.

As indicated above, the variations of embodiments of the present invention allow for enhancement of the resistance to a failure in the authentication machine implemented in the authentication system 22 (or the authentication service providing system 23). Hence, stable single sign-on can be provided.

Figure 29:
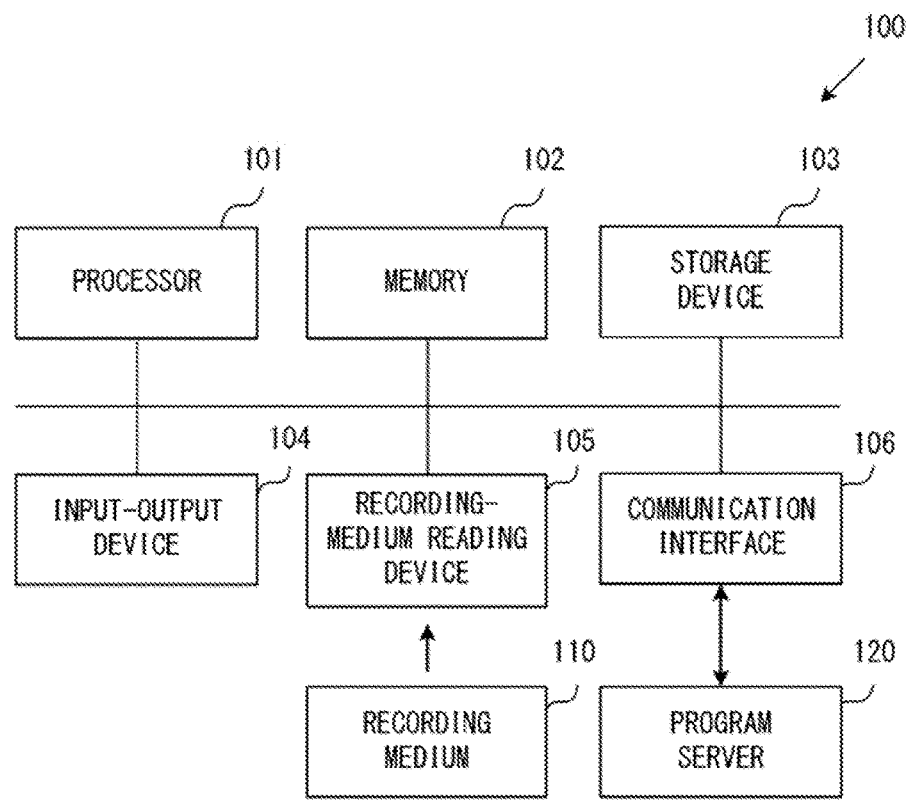
FIG. 29 illustrates an example of the hardware configuration of an authentication system.

FIG. 29 illustrates an example of the hardware configuration of the authentication system 22. The authentication system 22 is implemented by a computer 100 that includes a processor 101, a memory 102, a storage device 103, an input-output device 104, a recording-medium reading device 105, and a communication interface 106.

The processor 101 controls the operation of the authentication system 22 by executing a communication program stored in the storage device 103. The communication program includes a program code describing the procedures of the flowcharts depicted in FIGS. 21 and 23. The communication program also includes the authentication programs 53 depicted in FIG. 13. Thus, the processor 101 may execute the communication program so as to provide the functions of the execution unit 54, the logic execution unit 56, the calling unit 58, the history information generator 59, and the token generator 60 depicted in FIG. 13.

The memory 102 is used as a work area for the processor 101. The storage device 103 stores the above-described communication program and other programs. The authentication process database 57 may be built using the storage device 103.

The input-output device 104 includes input devices such as a keyboard, a mouse, a touch panel, and a microphone. The input-output device 104 also includes output devices such as a display device and a speaker. The recording-medium reading device 105 can obtain data and/or information recorded in a recording medium 110. The recording medium 110 is a removable recording medium that can be attached to and detached from the computer 100. The recording medium 110 is implemented by, for example, a semiconductor memory, a medium that records a signal by means of an optical effect, or a medium that records a signal by means of a magnetic effect. The above-described communication program may be supplied from the recording medium 110 to the computer 100. The communication interface 106 corresponds to the communication unit 51 depicted in FIG. 13 and can be connected to a network. When the above-described communication program is stored in a program server 120, the computer 100 may obtain the communication program from the program server 120.

The service provider systems 21 have a similar configuration to the computer 100 depicted in FIG. 29. However, in the service provider systems 21, a processor executes a software program so as to provide the functions of the authentication requesting unit 43, the logic verification unit 45, and the signature verification unit 46. The user terminal 13 and the authentication service providing system 23 each also have a similar configuration to the computer 100 depicted in FIG. 29.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A non-transitory computer-readable recording medium having stored therein a communication program, which when executed by a processor, causes the processor to execute a process, the process comprising:
   executing, when a user terminal accesses a service provider system, an authentication process based on an authentication request that comprises a description pertaining to an authentication condition and an authentication method that correspond to the service provider system, the description comprised in the authentication request indicates that a first authentication method is to be implemented when the authentication condition is satisfied, and that a second authentication method is to be implemented when the authentication condition is not satisfied;
   generating history information, the history information comprising information indicating whether the authentication condition is satisfied and information indicating a result of executing the authentication process by using the authentication method;
   deciding whether the authentication condition is satisfied when the authentication request is received;
   executing user authentication by using the first authentication method and generating the history information that comprises the information indicating the authentication condition is satisfied when the authentication condition is satisfied;
   executing user authentication by using the second authentication method and generating the history information that comprises the information indicating the authentication condition is not satisfied when the authentication condition is not satisfied; and
   transmitting the history information to the user terminal.

2. The recording medium according to claim 1, the process further comprising:
   generating identification information identifying an entity that has executed the authentication process; and
   transmitting the identification information to the user terminal in addition to the history information.

3. The recording medium according to claim 2, the process further comprising:
   generating a token by adding a signature indicating the identification information to data indicating the history information; and
   transmitting the token to the user terminal.

4. The recording medium according to claim 1, wherein the history information comprises information indicating a time at which the authentication process is performed using the authentication method.

5. The recording medium according to claim 1, the process further comprising:
   obtaining, from the service provider system, an alternative list indicating that, as a substitute for a first authentication method, a second authentication method is capable of being implemented;
   deciding whether the authentication process is capable of being executed using the first authentication method, when the description comprised in the authentication request indicates an instruction to perform the authentication process by using the first authentication method;

executing the authentication process by using the first authentication method when the authentication process is capable of being executed by using the first authentication method; and executing, based on the alternative list, the authentication process by using the second authentication method, when the authentication process is incapable of being executed by using the first authentication method, wherein the history information comprises information identifying an authentication method that was implemented among the first authentication method and the second authentication method, and information indicating a result of the executed authentication process.

6. An authentication device comprising:

a processor configured to:

execute, when a user terminal accesses a service provider system, an authentication process based on an authentication request that comprises a description pertaining to an authentication condition and an authentication method that correspond to the service provider system, the description comprised in the authentication request indicates that a first authentication method is to be implemented when the authentication condition is satisfied, and that a second authentication method is to be implemented when the authentication condition is not satisfied;

generate history information, the history information including comprising information indicating whether the authentication condition is satisfied and information indicating a result of executing the authentication process by using the authentication method;

decide whether the authentication condition is satisfied when the authentication device receives the authentication request;

execute user authentication by using the first authentication method and generating the history information that comprises the information indicating the authentication condition is satisfied when the authentication condition is satisfied, and execute user authentication by using the second authentication method and generating the history information that comprises the information indicating the authentication condition is not satisfied when the authentication condition is not satisfied; and a communication unit configured to transmit the history information to the user terminal.

7. An authentication method comprising:

executing, when a user terminal accesses a service provider system, an authentication process based on an authentication request that comprises a description pertaining to an authentication condition and an authentication method that correspond to the service provider system, the description comprised in the authentication request indicates that a first authentication method is to be implemented when the authentication condition is satisfied, and that a second authentication method is to be implemented when the authentication condition is not satisfied;

generating history information, the history information comprising information indicating whether the authentication condition is satisfied and information indicating a result of executing the authentication process by using the authentication method;

deciding whether the authentication condition is satisfied when the authentication request is received;

executing user authentication by using the first authentication method and generating the history information that comprises the information indicating the authentication condition is satisfied when the authentication condition is satisfied; and executing user authentication by using the second authentication method and generating the history information that comprises the information indicating the authentication condition is not satisfied when the authentication condition is not satisfied; and transmitting the history information to the user terminal.

8. A communication method for processing a login request from a user terminal in a communication system that comprises a first service provider system, a second service provider system, and an authentication system, the method comprising:

transmitting, by the user terminal, the login request to the first service provider system;

generating, by the first service provider system, in response to the login request, an authentication request that comprises a description pertaining to an authentication condition and an authentication method, the description comprised in the authentication request indicates that a first authentication method is to be implemented when the authentication condition is satisfied, and that a second authentication method is to be implemented when the authentication condition is not satisfied;

transmitting, by the user terminal, authentication information corresponding to the authentication request to the authentication system;

executing, by the authentication system, an authentication process for the authentication information in accordance with the description comprised in the authentication request;

generating, by the authentication system, history information, the history information comprising information indicating whether the authentication condition is satisfied and information indicating a result of executing the authentication process by using the authentication method;

generating, by the authentication system, a token comprising the history information and a signature identifying the authentication system;

transmitting, by the authentication system, the token to the user terminal;

transmitting, by the user terminal, the token to the first service provider system and the second service provider system;

accepting, by the first service provider system, login of the user terminal when the history information and the signature comprised in the token satisfy an authentication policy of the first service provider system;

accepting, by the second service provider system, login of the user terminal when the history information and the signature comprised in the token satisfy an authentication policy of the second service provider system;

deciding, by the authentication system, whether the authentication condition is satisfied when the authentication system receives the authentication request;

executing, by the authentication system, user authentication by using the first authentication method and generating the history information that comprises the information indicating the authentication condition is satisfied when the authentication condition is satisfied; and executing, by the authentication system, user authentication by using the second authentication method and generating the history information that comprises the information indicating the authentication condition is not satisfied when the authentication condition is not satisfied.

\* \* \* \* \*